United States Patent
Rune et al.

(10) Patent No.: US 8,626,155 B2
(45) Date of Patent: Jan. 7, 2014

(54) METHODS AND SYSTEMS FOR CLOSED SUBSCRIBER GROUP ROAMING

(75) Inventors: Johan Rune, Lidingö (SE); Tomas Nylander, Värmdö (SE); Jari Vikberg, Järna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 187 days.

(21) Appl. No.: 13/130,204

(22) PCT Filed: Nov. 24, 2009

(86) PCT No.: PCT/SE2009/051328
§ 371 (c)(1),
(2), (4) Date: May 19, 2011

(87) PCT Pub. No.: WO2010/059122
PCT Pub. Date: May 27, 2010

(65) Prior Publication Data
US 2011/0223887 A1 Sep. 15, 2011

Related U.S. Application Data

(60) Provisional application No. 61/117,464, filed on Nov. 24, 2008.

(51) Int. Cl.
*H04W 4/00* (2009.01)
*H04W 36/00* (2009.01)
*H04W 24/00* (2009.01)
*H04M 1/66* (2006.01)
*H04M 3/42* (2006.01)

(52) U.S. Cl.
USPC ............. 455/432.1; 455/411; 455/414.1; 455/433; 455/436; 455/456.1; 370/328; 370/331; 370/338

(58) Field of Classification Search
USPC ........... 455/411, 456.1, 433, 436, 422.1, 558, 455/432.1, 410, 432.3, 413, 432.2, 458, 455/444, 561, 41.2, 445.84, 550.1, 418, 455/452.1, 414.1, 331, 332; 370/328, 329, 370/311, 331, 245, 230, 338
See application file for complete search history.

(56) References Cited

U.S. PATENT DOCUMENTS

| 2008/0220782 A1* | 9/2008 | Wang et al. .................. 455/436 |
| 2008/0267114 A1* | 10/2008 | Mukherjee et al. ........... 370/315 |
| 2009/0094680 A1* | 4/2009 | Gupta et al. ...................... 726/3 |
| 2009/0303962 A1* | 12/2009 | Jokikyyny et al. ............ 370/331 |

(Continued)

FOREIGN PATENT DOCUMENTS

WO 00/56112 A1 9/2000

OTHER PUBLICATIONS

International Search Report mailed on Jun. 28, 2010 for International Application No. PCT/SE2009/051328.

(Continued)

*Primary Examiner* — Inder Mehra
(74) *Attorney, Agent, or Firm* — Potomac Patent Group, PLLC

(57) ABSTRACT

Systems and methods according to these exemplary embodiments provide for communications systems which use closed subscriber groups (CSG). More particularly, systems and methods for CSG roaming as well as transmitting information associated with CSG White lists are described herein.

28 Claims, 13 Drawing Sheets

(56) References Cited

U.S. PATENT DOCUMENTS

| | | | |
|---|---|---|---|
| 2009/0305699 A1* | 12/2009 | Deshpande et al. | 455/434 |
| 2010/0075670 A1* | 3/2010 | Wu | 455/434 |
| 2010/0273504 A1* | 10/2010 | Bull et al. | 455/456.1 |
| 2010/0304748 A1* | 12/2010 | Henttonen et al. | 455/436 |
| 2011/0098075 A1* | 4/2011 | Bienas et al. | 455/517 |
| 2011/0250881 A1* | 10/2011 | Michel et al. | 455/423 |

OTHER PUBLICATIONS

3GPP, "3rd Generation Partnership Project; Technical Specification Group Core Network and Terminals; 3GPP System Architecture Evolution; CT WG1 Aspects (Release 8)," Technical Report, 3GPP TR 24.801 v8.0.1, Oct. 2008, France XP050365686, pp. 1-218.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 8)," Technical Specification, 3GPP TS 23.401 v8.3.0, Sep. 2008, pp. 1-204.

3GPP, "3rd Generation Partnership Project; Technical Specification Group Radio Access Network; Evolved Universal Terrestrial Radio Access Network (E-UTRAN) Architecture description (Release 8)," Technical Specification, 3GPP TS 36.401 v8.3.0, Sep. 2008, pp. 1-18.

3GPP, "3rd Generation Partnership Project; Technical Specification Group Services and System Aspects; Service Requirements for Home NodeBs and Home eNodeBs (Release 9)," Technical Specification, 3GPP TS 22.220 v0.3.0, Jul. 2008, France XP050228828, pp. 1-13.

Qualcomm Europe, "UE Registration and Access Control for UTRA HNBs," 3GPP TSG-RAN WG3 Ad Hoc, R3-081658, Jun. 11-12, 2008, France, XP050165896, pp. 1-5.

Panasonic et al., "Support for Manual CSG whitelist update," 3GPP TSG RAN WG2#64, R2-086191, Nov. 10-14, 2008, Czech Republic, XP050321226, pp. 1-2.

Huawei, A method of white list management, 3GPP TSG CT WG1 Meeting #55, 1-083297, Revision of 3281, Aug. 18-22, 2008, Hungary, XP050308514, pp. 1-4.

International Preliminary Report on Patentability and Written Opinion of the International Searching Authority issued in corresponding International Application No. PCT/SE2009/051328 issued on May 24, 2011.

3GPP: "3rd Generation Partnership Project; Technical Specification Group Services and System Aspects; Service Requirements for Home NodeBs and Home eNodeBs; (Release 9)" 3GPP Draft; TS 22.220 V0.3.0, 3rd Generation Partnership Project (3GPP), Mobile Competence Centre; 650, Route Des Lucioles; F-06921 Sophia-Antipolis Cedex; France, vol. SA WG1, No. Sophia; 20080725, Jul. 25, 2008, XP050228828, entire document.

3rd Generation Partnership Project; Technical Specification Group Core Network and Terminals; 3GPP System Architecture Evolution; CT WG1 Aspects (Release 8) 3GPP Standard; 3GPP TR 24.801, 3rd Generation Partnership Project (3GPP), Mobile Competence Centre; 650, Route Des Lucioles; F-06921 Sophia-Antipolis Cedex; France, No. V8.0.1, Oct. 1, 2008, pp. 1-213, XP050365686.

Qualcomm Europe: "UE Registration and Access Control for UTRA HNBs," 3GPP Draft; R3-081658, 3rd Generation Partnership Project (3GPP), Mobile Competence Centre; 650, Route Des Lucioles; F-06921 Sophia-Antipolis Cedex; France, vol. RAN WG3, No. Sophia Antipolis, France; 20080609, Jun. 9, 2008, XP050165896, entire document.

* cited by examiner

METHODS AND SYSTEMS FOR CLOSED SUBSCRIBER GROUP ROAMING

TECHNICAL FIELD

The present invention relates generally to communications and in particular to methods, devices and systems for closed subscriber group (CSG) roaming.

BACKGROUND

Radiocommunication networks were originally developed primarily to provide voice services over circuit-switched networks. The introduction of packet-switched bearers in, for example, the so-called 2.5 generation (G) and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radiocommunication applications, while at the same time using legacy infrastructure, network operators could deploy hybrid networks wherein a next generation radiocommunication system is overlaid onto an existing circuit-switched or packet-switched network as a first step in the transition to an all IP-based network. Alternatively, a radiocommunication system can evolve from one generation to the next while still providing backward compatibility for legacy equipment.

Specification is ongoing in 3GPP for Evolved Universal Terrestrial Radio Access Network (E-UTRAN) that is the next generation of Radio Access Network (RAN). Another name for E-UTRAN, used in the present specification, is Long Term Evolution (LTE) RAN. The core network to which E-UTRAN is connected is called Evolved Packet Core (EPC), also known as System Architecture Evolution (SAE) network. Both the E-UTRAN and the EPC (and possibly some other node(s), such as the Home Subscriber Server (HSS), depending on the definition of the EPC) comprise together the Evolved Packet System (EPS), which is also known as the SAE/LTE network. A base station in this concept is called an E-UTRAN NodeB (eNodeB or eNB). These ongoing studies also include the possibility to have an E-UTRAN base station which provides home or small area coverage for a limited number of users. This base station is, in 3GPP and in this document, called a Home E-UTRAN NodeB (HeNB) or home base station. Other names used for this type of base station are LTE Home Access Point (LTE HAP) and LTE Femto Access Point (LTE FAP). In 3G Universal Mobile Telecommunication System (UMTS) the equivalent base station to an HeNB is referred to as a Home Node B (HNB). While HeNBs are used herein, similar concepts apply to the HNB of the 3G UMTS systems.

An HeNB typically provides regular service for the end users and can be connected to the mobile core network using an IP-based transmission link. The radio service coverage provided by an HeNB is called a femtocell in this application. Furthermore, a femtocell is normally a Closed Subscriber Group (CSG) cell, i.e., a cell in which only a limited but variable set of users is normally allowed to access the network. The HeNB would, in most cases, use the end user's already existing broadband connection (e.g. xDSL and Cable) to achieve connectivity to the operator's Public Land Mobile Network (PLMN) and possibly to other eNBs/HeNBs. One of the main reasons for providing wireless local access using HeNBs and femtocells is to provide cheaper calls or transaction rates/charges when a device (e.g., a mobile phone) is connected via an HeNB as compared to when that device is connected via an eNB.

More generally, an HeNB and similar devices can be considered to be a sort of "home base station". As used herein, the term "home" is used to modify the phrase "base station" to distinguish such equipment from other conventional base stations based upon characteristics such as one or more of: (1) geographic radio coverage provided (i.e., home base station coverage area is normally less than "regular" base station coverage area), (2) subscriber access (i.e., the subscribers who can obtain service from the home base station may be limited whereas a "regular" base station will typically provide access to any subscribers (or at least to a larger group of subscribers than a home base station) who are within range), and (3) home base stations are normally installed by the end users themselves without any intervention from the operator's personnel, whereas regular base stations are typically installed by operator personnel. This latter quality of home base stations suggests that the installation will generally be highly automated and of a "plug and play" nature. Note, however, that home base stations need not literally be installed in personal residences, and may find applications in businesses, public areas, etc., wherein the qualities of a home base station are desirable to, e.g., supplement coverage provided by regular base stations. Home gateways, as the phrase is used herein, are gateways which interface home base stations with a node in the radiocommunication system, e.g., a core network node.

When a subscriber from one PLMN visits another PLMN this is referred to as "roaming". Therefore, in the context of this document, when a subscriber is included in the CSG of another PLMN/operator than the subscriber's home operator, this is referred to as "CSG roaming" and the concerned subscriber is referred to as a "foreign subscriber".

The problem that arises in conjunction with CSG roaming is related to the management of CSG data and CSG Whitelists, which are designed with a single PLMN in mind (to which both the HeNB and the CSG members are assumed to belong). The CSG data is managed by the Operation Maintenance Administration and Provisioning (OMA&P) system (sometimes also known as OAM&P system) of the PLMN to which the HeNB connects. The OMA&P system deals with, for example, configuration, supervision and tuning of the radiocommunication network, administration of subscriber related data and provisioning of data, features and services. The CSG Whitelist of a subscriber, which includes identities of the CSGs the subscriber is a member of and thus is allowed to access, is managed by the OMA&P system and the HSS of the subscriber's home PLMN and the subscriber's UE (e.g., its USIM). Finally, the CSG based access control is handled by a control plane core network node, e.g., an MME or SGSN (or possibly MSC or MSC server)) which the HeNB is connected to, i.e., a core network node of the PLMN of the HeNB and associated CSG. Hence, if the HeNB and a subscriber included in the CSG belong to different PLMNs, cooperation between the involved entities of the two different PLMNs is required to manage the CSG data and the CSG Whitelist, as well as the CSG based access control. This cooperation and information transfer that is needed is not possible to achieve with the currently assumed architecture and functionality, due to lack of the required inter-PLMN interfaces and procedures. Specifically, the OMA&P systems of two different PLMNs cannot communicate this type of CSG information directly to update each other.

For example, data generally cannot be exchanged between the OMA&P system of one PLMN and the HSS of another PLMN and the OMA&P system of one PLMN cannot transfer data (e.g., using Open Mobile Alliance (OMA) device management (DM) or over-the-air (OTA) technology) to the UE of a subscriber of another PLMN. OMA DM is a protocol designed for configuration and management of mobile devices which runs on top of IP and is thus basically network independent. OTA technology comprises techniques for configuring data, installing features, etc. in mobile terminals, including SIM/USIM applications, over the radio interface (also known as the air interface, hence the name OTA) while the mobile terminal is being used in regular operation, e.g., by a user to make calls. A typical OTA technology is based on the Short Message Service (SMS).

As an example illustrating the problem, assume an owner of an HeNB adds a foreign subscriber to the CSG of the HeNB. The foreign subscriber is thus added to the CSG data in an OMA&P system of the network operator that serves the network to which the HeNB connects. The OMA&P system would then normally inform the network operator's HSS so that the HSS can update the CSG Whitelist in the data record of the concerned subscriber, but the OMA&P system cannot generally communicate with the foreign subscriber's HSS due to a lack of interfaces and/or interface standardization between these nodes. If OMA DM or OTA technology is used for configuring the CSG Whitelist in the UE, the OMA&P system would normally also perform this task, but the OMA&P system is not authorized to configure data in the UE of a foreign subscriber (e.g., it lacks the appropriate security related data and possibly other required data/information). Consequently the UE based CSG Whitelist will not be updated accordingly, so the UE will not become aware that it is included in a new CSG. If the UE should still attempt to access the HeNB, e.g., after a manual override attempt of the UE based CSG Whitelist, a consequence is that the core network node performing the CSG based access control (the core network node serving the UE) will receive a CSG Whitelist from the HSS of the foreign subscriber, which does not include the CSG ID of the concerned CSG and hence the CSG based access control will fail and the UE will be rejected for gaining access to that HeNB.

Accordingly, it would be desirable to have methods and systems which address the afore-described issues associated with CSG roaming.

SUMMARY

Exemplary embodiments relate to systems and methods for improving communications in systems which allow for closed subscriber group (CSG) roaming. According to exemplary embodiments it is desirable to transfer information regarding authorization to CSGs as needed. Advantages according to exemplary embodiments described herein include, for example, the ability to allow CSG roaming between different Public Land Mobile Networks (PLMNs). However, it will be appreciated by those skilled in the art that such advantages are not to be construed as limitations of the present invention except to the extent that they are explicitly recited in one or more of the appended claims.

According to one exemplary embodiment, a method for mobility management in a communication system having a closed subscriber group, CSG, associated with at least one home base station includes receiving a message, from a network's Operation Maintenance Administration and Provisioning, OMA&P, system, at a mobility management node, wherein the message includes information associated with authorization for a roaming subscriber to access the at least one home base station which serves the CSG, and communicating, by said mobility management node, CSG information over an interface toward a home subscriber server, HSS, wherein the step of communicating includes at least one of (1) transmitting at least a part of the information associated with authorization for a roaming subscriber to access the at least one home base station which serves the CSG towards the HSS of the roaming subscriber and (2) receiving information from the HSS associated with CSG authorizations for the roaming subscriber.

According to another exemplar embodiment, a method for mobility management in a communication system having a closed subscriber group, CSG, associated with at least one home base station includes communicating CSG information over an interface toward a home subscriber server, HSS, wherein the step of communicating includes at least one of: (1) receiving information at the HSS from a mobility management node in another public land mobile network, PLMN, wherein the information is associated with authorization for a subscriber that is roaming to access the at least one home base station which serves the CSG and (2) transmitting a message towards a mobility management node in the another PLMN from the HSS, wherein the message includes information associated with CSG authorizations for the subscriber that is roaming.

According to yet another exemplary embodiment, a method for mobility management in a communication system having two separate networks includes creating a home closed subscriber group, CSG, Whitelist associated with a subscriber in a first network, storing the home CSG Whitelist associated with the subscriber in a home subscriber server, HSS, in the first network, creating a visiting CSG Whitelist associated with the subscriber in a second network, and storing the visiting CSG Whitelist associated with the subscriber in an Operations Maintenance Administrative and Provisioning, OMA&P, system in the second network.

According to still another exemplary embodiment, a mobility management node includes: an interface configured to receive a message, from a network's Operation Maintenance Administration and Provisioning, OMA&P, system, wherein the message includes information associated with authorization for a roaming subscriber to access at least one home base station which serves a closed subscriber group, CSG, and a processor configured to communicate CSG information over another interface toward a home subscriber server, HSS, by performing at least one of: (1) transmitting at least a part of said information associated with authorization for a roaming subscriber to access the at least one home base station which serves the CSG towards the HSS of the roaming subscriber and (2) receiving information from the HSS associated with CSG authorizations for the roaming subscriber.

According to another exemplary embodiment, a home subscriber server, HSS, includes an interface configured to communicate CSG information with a mobility management node in another public land mobile network, PLMN, and a processor configured to coordinate communication of the CSG information by performing at least one of (1) receiving information at the HSS from the mobility management node, wherein the information is associated with authorization for a subscriber that is roaming to access the at least one home base station which serves the CSG and (2) transmitting a message towards the mobility management node from the HSS, wherein the message includes information associated with CSG authorizations for the subscriber that is roaming.

BRIEF DESCRIPTION OF THE DRAWINGS

The accompanying drawings illustrate exemplary embodiments, wherein.

DETAILED DESCRIPTION

Figure 1:
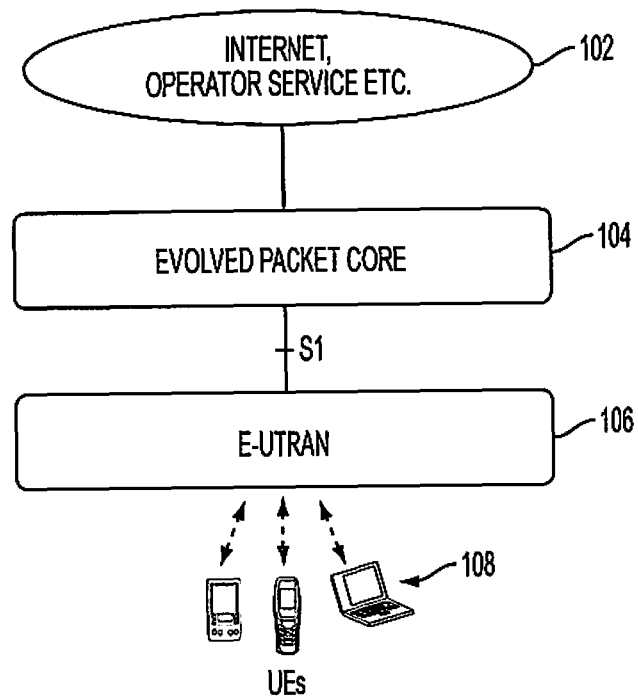
FIG. 1 depicts an overview of a system within which exemplary embodiments can be implemented.

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Prior to discussing aspects of the exemplary embodiments below, a purely illustrative overview of a system in which closed subscriber group (CSG) roaming as well as CSG Whitelist information exchange can occur, will now be described with respect to FIGS. 1-3 to provide some context for this discussion. According to exemplary embodiments, a communication system in which signaling connections can be established is shown generally in FIG. 1 and includes various user equipments (UEs) 108, e.g., mobile phones, laptop computers and personal digital assistants (PDAs), which communicate over a wireless interface with an Evolved Universal Terrestrial Radio Access Network (E-UTRAN) 106. The E-UTRAN 106 communicates with nodes in the Evolved Packet Core (EPC) 104 over S1 interface(s). The EPC 104 can then route calls/requests from the UEs 108 to various separate networks and services as shown generally by the Internet/Operator Service 102.

According to exemplary embodiments, a long term evolution (LTE) radio access network (RAN)/system architecture evolution (SAE) network can include various control functions and nodes for radio resource management. For example, FIG. 2 shows a simplified version of an Operator Network 202 which includes an Operation Maintenance Administration and Provisioning (OMA&P) system 204, a Home Subscriber Server (HSS) 210 and an Evolved Packet Core (EPC) 206. An OMA&P system 204 is generally a focal point from which an operator can control the network 202 and perform functions such as configuration of network components and other operations/maintenance support functions. The EPC 206 includes a mobility management entity (MME) 208 which can perform (and/or support) various functions of the network such as, bearer management functions, authentication and gateway selection (e.g. selection of the Serving GW (SGW)). The home subscriber server (HSS) 210 is a database containing subscriber information which supports authentication/authorization issues associated with UEs 214, 222 (and other nodes) as well as subscription related data for all subscribers in the network. Note that the HSS 210 may sometimes, depending on the EPC definition, be considered to be a part of the EPC 206.

The EPC 206 also includes a Serving Gateway (SGW)/Packet Data Network Gateway (PDN GW) 212. The SGW function performs a variety of tasks, such as packet routing and forwarding, mobility anchoring for inter-3GPP mobility, i.e. mobility between different cellular networks using 3GPP technology, as well as being the gateway which terminates the S1-U interface towards the E-UTRAN 216. The PDN GW (PGW) function also performs a variety of tasks, such as IP address allocation for UEs 214, 222, and is a link to other networks, e.g., the Internet, as well as being an anchor point for mobility between 3GPP networks and non-3GPP networks. While shown as a single entity, the SGW/PDN GW 212 can be implemented as separate entities within the EPC 206.

The E-UTRAN 216 includes a number of eNodeBs (eNB) 218, 220 which communicate with the EPC 206 over versions of the S1 interface, e.g., S1-MME towards the MME(s) and S1-U towards the SGW(s). Additionally, the eNBs 218, 220 can communicate wirelessly with various UEs 214, 222 over a wireless interface denoted by "LTE-Uu". The connection between the eNB 220 and an MME (which may be the same as or different from MME 208) is omitted to simplify the figure. Other connections have also been omitted to simplify the figure, e.g., the OMA&P system 204 can be connected to all of the other nodes in the network in addition to the HSS 210. Additionally, it will be appreciated by those skilled in the art, and as described in more detail below, that an eNB can be connected to a plurality of MMEs. Moreover, the eNBs 218 and 220 may also be considered to be part of the operator network 202.

Figure 2:
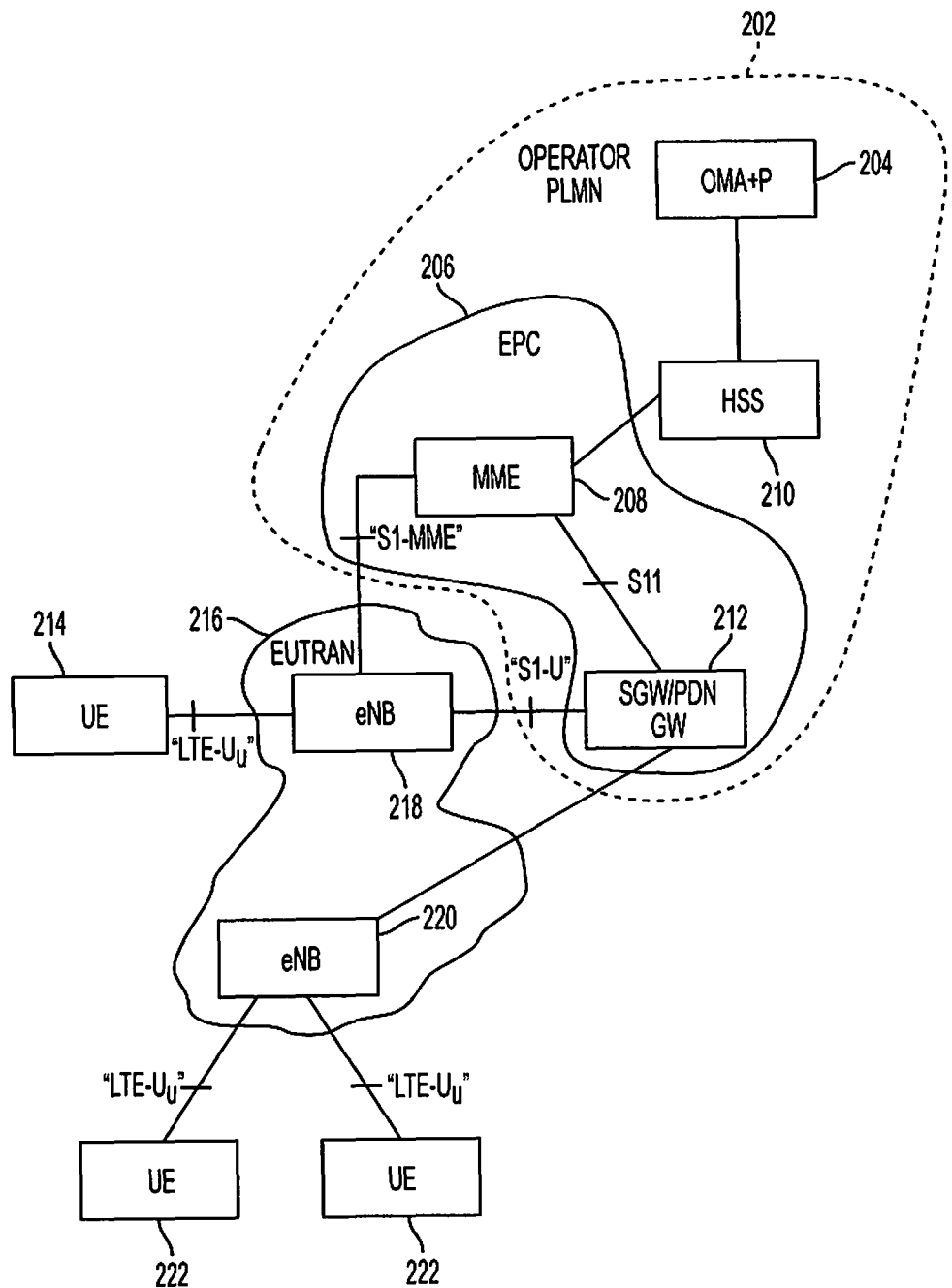
FIG. 2 illustrates an operator network in communication with an Evolved Universal Terrestrial Radio Access Network (E-UTRAN) in which exemplary embodiments can be implemented.

System architectures according to exemplary embodiments will also include HeNBs (or more generally "home base stations") in addition to, potentially, those nodes illustrated in FIG. 2. FIG. 3 shows aspects of an exemplary LTE RAN architecture and relevant interfaces with, for example, eNBs 300 serving macrocells 302 and HeNBs 304 serving femtocells or microcells 306. As used herein, the term "home" as it is used to modify the phrase "base station" is intended to distinguish such equipment from other conventional base stations based upon characteristics such as one or more of the three characteristics described above in the Background section of this application. Additionally, an HeNB 304 will typically have only one S1 connection toward the network, i.e., its connection to the HeNB GW 308, whereas an eNB 300 will typically have multiple "S1-flex" connections toward various nodes in the network. Although the word "home" is used to distinguish these different types of equipment, it should be noted that home base stations are not limited to base stations which are literally disposed within a home nor are home base stations limited to base stations which provide radiocommunication service to only one home. For example, a home base station can be used to supplement coverage of a "regular" base station in congested public areas or the home base station can be owned by a business enterprise and located in various facilities owned by the enterprise. Similarly, a home gateway is a gateway or concentrator node which connects one or more home base stations to one or more nodes in a core network 310, e.g., an SGW/PDN GW 212 and/or an MME 208, but is not itself typically located within a home. The HeNB Concentrator Node 308 shown in FIG. 3 is also referred to herein as an HeNB Gateway (HeNB GW) or, more generally, a "home gateway".

However, the home gateway node 308 may also provide some of the functionality which would otherwise be provided by the home base stations 304 so that these home base stations 304 can be kept relatively simple and cheap. One example of such functionality is the RAN part of the CN Pool (e.g., MME Pool) functionality (sometimes also denoted "S1-flex" as mentioned above), e.g., selection of the MME Pool member, an MME 208, for a particular UE 108, that can be implemented in the home gateway node 308. The home gateway 308 may also hide the signaling load related to turning on and off the home base stations 304 from the core network 310. For example, when an HeNB 304 is powered on and off and then on again then only the S1 interface between the HeNB 304 and the HeNB GW 308 is affected (e.g. established, torn down, re-established, etc.) without the involvement of the MME(s) 208. UEs 108 which are located within a femtocell 306 may obtain radiocommunication service from either that femtocell or the overlapping macrocell 302 (if one is present), according to rules established for this particular network.

As described above, a femtocell 306 (i.e., a coverage area of an HeNB 304) may be a closed subscriber group (CSG) cell. This means that, normally, only a selected group of subscribers are allowed to access the network through that cell. Accordingly, the HeNB 304 broadcasts information to inform UEs 108 that a cell is a CSG cell. In addition, a CSG cell is identified by a CSG identifier (ID), which is also broadcast in the cell by the HeNB 304 as a part of the system information. Typically, each CSG cell has its own unique CSG ID, but it may also be possible to define the same CSG ID for multiple cells, thereby forming a CSG zone, in which the same selected group of subscribers is allowed access.

Hence, not all subscribers may be allowed to access a certain HeNB 304 and a certain subscriber may not be allowed to access all HeNBs 304. Typically, a CSG administrator (typically the owner of a HeNB 304—henceforth CSG administrator and HeNB owner are used interchangeably) defines which subscribers are allowed to access a femtocell 306 (CSG cell) of the HeNB 304, i.e., defines which subscribers that are included in the CSG of the femtocell 306). Therefore, the HeNB 304 can be considered to be associated with or as serving the CSG which is accessed through the HeNB 304. The information that identifies the subscribers who are allowed to access a particular CSG cell is herein referred to as "CSG data", "CSG status", "CSG definition", "CSG subscriber list", "CSG Whitelist" or "HeNB access list" (which is an equivalent term assuming that the HeNB 304 only serves one CSG which is often expected to be the case).

According to exemplary embodiments, two (or more) PLMNs can communicate with each other regarding CSG roaming, and a UE 108 based in one PLMN can obtain access to a CSG associated with a second PLMN. In order to facilitate this exemplary information exchange, interfaces are described below which allow information to be transmitted, in both directions, between an Operation Maintenance Administration and Provisioning (OMA&P) system to an MME (or MME pool) both of which are located in the same PLMN and for information to be transmitted, in both directions, between an MME in one PLMN to an HSS located in a separate PLMN. The exemplary information flows described below can occur over currently existing interfaces which, while not traditionally used for these information flows, can be adapted for such usage to provide improved CSG roaming implementations without requiring the design and standardization of wholly new interfaces.

Figure 3:
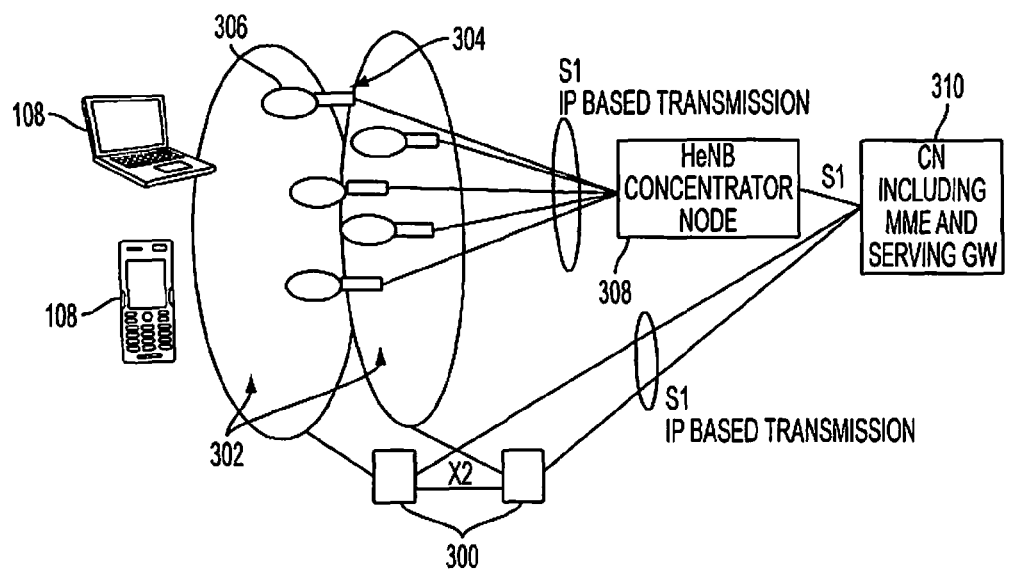
FIGS. 3-4 illustrate various portions of exemplary architectures including home eNodeBs (HeNBs), femtocells and Public Land Mobile Networks (PLMNs) according to exemplary embodiments.
Figure 4:
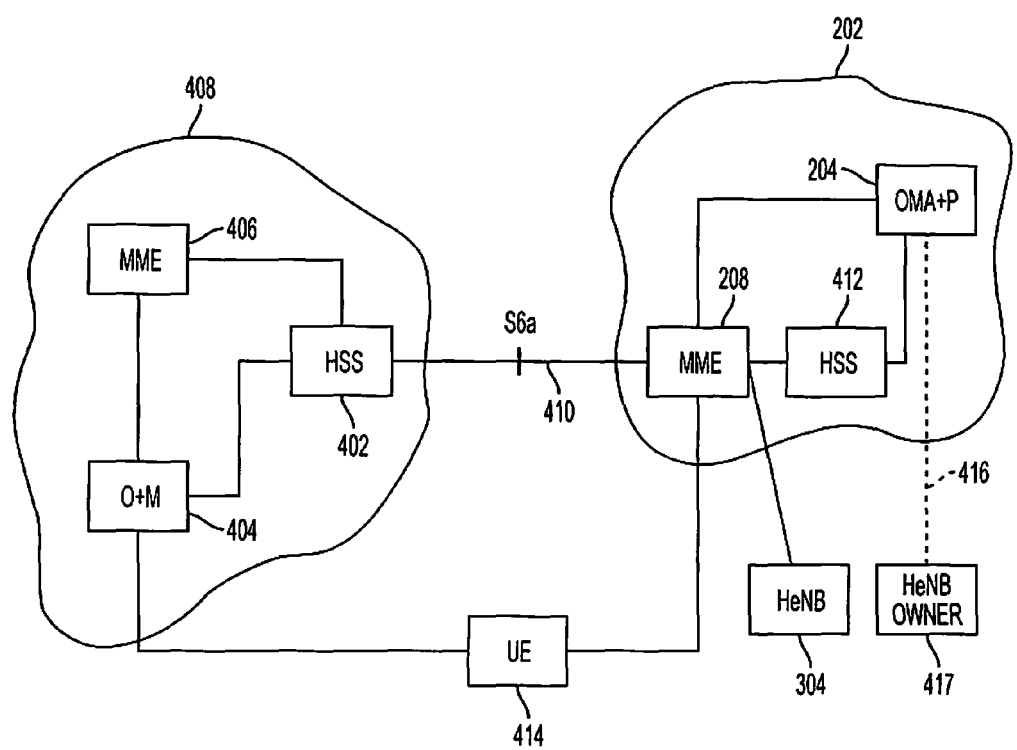

An exemplary architecture which, in combination with that of FIGS. 1-3, can be used to transmit CSG Whitelist information and support CSG roaming according to exemplary embodiments is shown in FIG. 4. HeNB 304, e.g., owned by a subscriber to a (home) PLMN 202, is an access point to femtocell 306 and has a CSG associated therewith controlled by the owner/subscriber. PLMN 202 includes an OMA&P system 204, HSS 412 and MME 208. Communications can flow between the PLMN 202 and a "foreign" PLMN 408 through, for example, the S6a interface 410, which connects the MME 208 and the foreign HSS 402. The foreign PLMN 408 includes a foreign HSS 402, a foreign MME 406 and a foreign OMA&P system 404. UE 414 is associated with a subscriber of the foreign PLMN 408 whose access to a CSG associated with the PLMN 202 has changed, e.g., the UE 414 has had access granted or removed to the CSG associated with HeNB 304. Additionally, UE 414 can have communications, in some cases, with entities in both the PLMN 202 (i.e. the home PLMN of the HeNB 304 and its owner) and the foreign PLMN 408 (which is the home PLMN of the user associated with the UE 414). As used herein "foreign" describes and differentiates entities associated with anything other than the PLMN 202 of the HeNB 304 and its owner.

According to exemplary embodiments, CSG data may be created and/or modified, e.g., to add or remove subscribers from the CSG. The CSG data may be created via a web interface (or other interface between the HeNB 304 owner and the network operator of PLMN 202), for example, the CSG data may be entered by a subscriber associated with the HeNB 304, via a web interface to the home OMA&P system 204. The CSG data is stored in a database in the home operator's network 202, which may be part of the operator's OMA&P system 204. Note that the entities interacting with the HeNB 304's owner for CSG data manipulation purposes may be entities devoted to subscriber administration/provisioning and as such regarded as part of the OMA&P system 204.

A subscriber, from a foreign PLMN 408 or the home PLMN 202, may be included in a CSG subscriber list indefinitely, e.g., until explicitly removed, or on a time limited basis, e.g., one week, which is often referred to as a "guest". Typically, the HeNB 304 owner identifies the subscribers, both home and foreign, who should be included in the CSG data by providing to the network operator the ISDN numbers (MSISDN), IMSIs or other identifiers of the concerned subscribers.

The CSG data is reflected in so-called CSG Whitelists associated with the concerned UEs 414. Each UE 414 has a CSG Whitelist, which includes the CSG ID of each CSG that the UE 414 (or more precisely the subscriber using the UE 414) is included in, i.e., the CSG Whitelist includes the CSG ID of each femtocell 306 that the UE/subscriber 414 is allowed to access. A CSG is more directly associated with a group of subscribers rather than a group of UEs 414, but for simplicity UEs 414 will often be identified herein as the elements of which a CSG is formed. Similarly, a CSG Whitelist is more directly associated with a subscriber—not a UE 414, but herein the UE 414 shall be used as a proxy for the subscriber using the UE 414, such that a CSG Whitelist may be referred to as belonging to the UE 414 and the UE 414 may be said to be allowed or not allowed access to a CSG cell.

The CSG Whitelist of a subscriber can be stored in the home HSS 412 of the subscriber's home PLMN 202 together with other subscriber data. The CSG Whitelist may be transferred from the home OMA&P system 204 to the home HSS 412, where it is distributed to appropriate subscriber records. This applies to both creation and updates, i.e., additions or exclusions of subscribers, of the CSG data. It is also possible for the home OMA&P system 204 to maintain its own copies of the CSG Whitelists or to assemble them from the CSG data when needed. The CSG Whitelist of a subscriber is also stored in the UE 414 (on, for example, a data storage card in the UE 414, such as a Subscriber Identity Module (SIM) card or a Universal SIM (USIM) card) of the subscriber, so that the UE 414 itself can determine whether it is allowed to access a certain CSG cell or not in order to avoid useless access attempts. The CSG Whitelist may be transferred from the network to the UE 414 via open mobile alliance (OMA) device management (DM), NAS signaling, Over-The-Air (OTA) USIM configuration technology, Short Message Service (SMS), or some other technology.

Furthermore according to exemplary embodiments, in EPS the CSG Whitelist of a UE 414 is downloaded from the foreign HSS 402 to the MME serving the UE 414, e.g., the MME 208 also known as the serving MME 208 in this case. Other information can also be transmitted at or near this time, e.g., other subscriber data which is relevant for the serving MME 208 and which includes both the International Mobile Subscriber Identity (IMSI) and the Mobile Subscriber Integrated Service Digital Network Number (MSISDN) of the subscriber so that the MME 208 can perform CSG based access control of UEs 414 requesting network access via a CSG cell. This mechanism is likely to be similar in 3G, utilizing a node corresponding to the MME 208, e.g., the Serving GPRS Support Node (SGSN) and/or the Mobile Switching Center (MSC) server.

The search for allowed CSG cells is not governed by the network, but is left to the UE 414 to handle autonomously. To identify an allowed CSG cell, the UE 414 reads the CSG ID from the system information broadcast in the cell and compares it with the CSG ID(s) stored in its CSG Whitelist. When a match is found the UE 414 has discovered an allowed CSG cell, e.g., associated with a home base station. In the exemplary embodiments the identifier used to identify a subscriber in CSG data is the MSISDN of the subscriber. However, it should be understood that the IMSI of the subscriber may well be used as an alternative to the MSISDN, even though the exemplary embodiments typically only mention the MSISDN.

According to exemplary embodiments, when a HeNB 304 owner includes (or removes) a foreign subscriber in (from) the CSG of an HeNB 304, CSG data update information, e.g., information associating the subscriber's MSISDN with the CSG ID of the CSG, is stored in the home OMA&P system 204 of the home PLMN 202 to which the HeNB 304 owner belongs. The removal of a subscriber in a CSG Whitelist may be noticed in the CSG update information by a lack of a previous subscriber in the message instead of some form of positive confirmation of removal. The home OMA&P system 204 transfers this CSG data update information to the MMEs in the MME pool to which the HeNB 304 is connected. When the concerned foreign subscriber registers with one of these MMEs, the MME 208 obtains the foreign subscriber's CSG Whitelist from the foreign subscriber's HSS 402 via, according to exemplary embodiments, the S6a interface between an MME 208 serving a visiting subscriber and the visiting (foreign) subscriber's HSS 402. The serving MME 208 then compares the CSG data update information it received from the home OMA&P system 204 with the CSG Whitelist received from the foreign HSS 402 to determine whether the CSG ID of the CSG needs to be added or removed from the CSG Whitelist. If the serving MME 208 determines that the CSG Whitelist needs to be updated, the serving MME 208 informs the foreign subscriber's HSS 402 that the Whitelist needs to be updated. In response, the foreign HSS 402 updates the CSG Whitelist that it maintains. The serving MME 208 may immediately inform the foreign subscriber's HSS 402 that the Whitelist needs to be updated in response to determining that the list needs to be updated or the serving MME 208 may inform the foreign HSS 402 at a later time, e.g., when the serving MME 208 has some message that it needs to send to the foreign HSS 402.

The serving MME 208 may also proactively update the CSG Whitelist stored in the foreign subscriber's UE 414, e.g., via Network Access Stratum (NAS) signaling. Otherwise, the update of the CSG Whitelist in the foreign subscriber's HSS 402 triggers the foreign subscriber's PLMN 408 to initiate the regular mechanism for updating the CSG Whitelist in the UE 414.

Problems associated with updating CSG Whitelists, as well as the CSG based access control work for CSG roaming, typically stem from the lack of interfaces and procedures between the nodes in different PLMNs which are required to make the management of CSG data and CSG Whitelists as well as the CSG based access control work for CSG roaming. Exemplary embodiments described below are structured into different scenarios, which scenarios illustrate different cases of the location or state of a foreign subscriber's UE 414 and during which the foreign subscriber is added to (or removed from) a CSG. The flowcharts of FIGS. 5-8 summarize the exemplary steps and information flows of the various exemplary embodiments used in CSG roaming.

Figure 5:
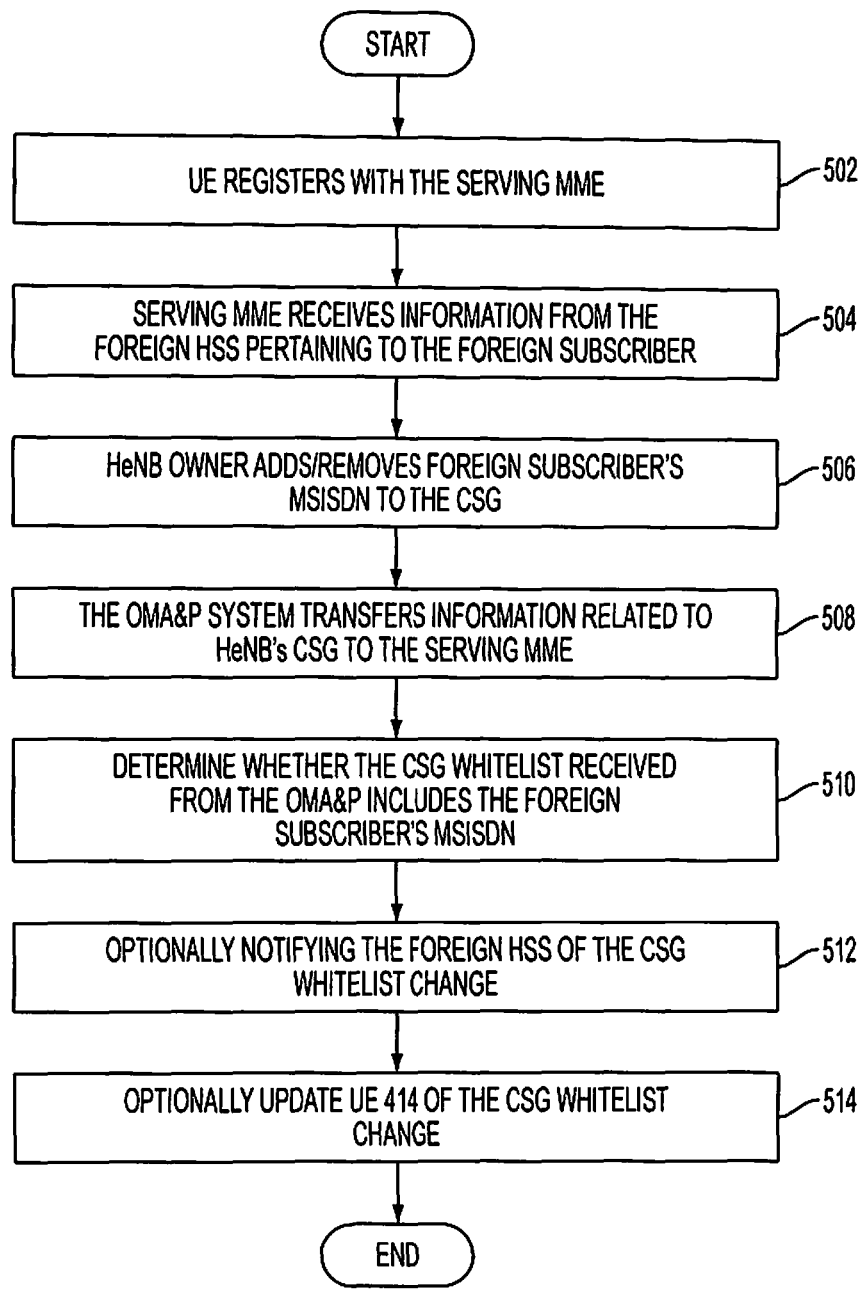
FIG. 5 shows a method flowchart associated with closed subscriber group (CSG) roaming according to exemplary embodiments.

According to one exemplary embodiment, as shown in the flowchart of FIG. 5, UE 414 is to register with an MME 208 from the MME Pool (not shown) to which the HeNB 304 is connected (probably, but not necessarily, via a HeNB GW) at the time the UE 414 is added to the HeNB's 304 CSG. An MME Pool is a collection of MMEs in the core network of a PLMN 202. In this exemplary embodiment, the foreign subscriber (FS) uses UE 414 to gain access, often via an associated macrocell (however if there is no macrocell the UE 414 may attempt to gain access via HeNB 304), to the PLMN 202 of HeNB 304. Thus UE 414 registers with an MME 208, in step 502, which is in an MME pool to which HeNB 304 is connected. The MME 208 with which UE 414 registers is called the serving MME 208.

Next, in step 504, the serving MME 208 receives, from the foreign HSS 402 which is the HSS 402 associated with the foreign subscriber using UE 414, data pertaining to the foreign subscriber and/or UE 414, including a CSG Whitelist associated with the foreign subscriber and/or UE 414. In step 506, the owner of HeNB 304 adds (or removes) the foreign subscriber's MSISDN to (or from) HeNB's 304 CSG, e.g., the CSG for which HeNB 304 is the access point. The owner may, for example, do this using a web interface, as shown by dashed line 416 toward HeNB owner (or owner's computer) in FIG. 4, to an entity in the home OMA&P system 204. In step 508, the home OMA&P system 204 transfers information related to HeNB's 304 CSG (e.g., the MSISDNs of each subscriber that is included in the CSG or other information that can be used by the MME 208 to determine that the foreign subscriber's MSISDN has been added to (or removed from) HeNB's 304 CSG) to the serving MME 208 (as well as to the other MMEs in the same MME pool as MME 208) to which the HeNB 304 is connected. This way the home OMA&P system 204 ensures that the MME 208 has up-to-date CSG data for the CSGs belonging to the MME 208. Additionally, while this exemplary embodiment (and other exemplary embodiments) refers to MME 208, the information sent to MME 208 is typically also sent to the other MMEs in the same MME pool (not shown). This transfer may involve transfer of information between different entities in the OMA&P system 204 (e.g., between an entity receiving and/or storing CSG data and an entity responsible for management of MMEs). Also, regarding steps 502-508, steps 502 and 504 may occur independently of steps 506 and 508 and as such steps 502 and 504 may occur before, after or in parallel with steps 506 and 508.

According to exemplary embodiments, in step 510, the serving MME 208, which now serves the foreign subscriber's UE 414, uses the information received from the home OMA&P system 204 to determine whether the information related to HeNBs CSG received from the OMA&P includes the foreign subscriber's MSISDN. For example, the serving MME 208 identifies the MSISDN(s) in the received updated CSG data which is (are) affected by the update and discovers that there is a discrepancy between the received CSG Whitelist of the foreign subscriber and the received CSG data from the home OMA&P system 204 and concludes that the CSG Whitelist of the foreign subscriber needs to be updated. Since the serving MME 208 is involved in CSG Whitelist updates in this manner only for foreign subscribers, the MME 208 according to this exemplary embodiment only needs to consider MSISDNs belonging to other PLMNs, e.g., foreign PLMN 408, when checking for affected MSISDNs. After performing this determination in step 510, the foreign HSS 402 is notified of the CSG Whitelist change in step 512 by the serving MME 208. Next, in step 514, the UE 414 is updated of the CSG Whitelist change. Steps 512 and 514 only need to be performed if a change in the CSG Whitelist occurs. According to exemplary embodiments, there are two options for accomplishing these updates to the foreign HSS 402 and the UE 414.

According to exemplary embodiments, both options, for performing steps 512 and 514 have the serving MME 208 communicating with the foreign subscriber's HSS 402 utilizing an existing interface, e.g., the S6a interface 410. In the first exemplary option, a new MME-HSS procedure (message pair) is introduced so that the serving MME 208 can relatively immediately inform the HSS 402 that the CSG Whitelist associated with UE 414 needs to be updated, thereby triggering the regular update mechanism for the UE 414 based CSG Whitelist. In the second exemplary option, MME 208 handles things locally by itself, including proactive updating of the UE 414 based CSG Whitelist and CSG based access control in accordance with the new information, until there is a message to be sent, for some other reason, to the foreign subscriber's HSS 402 in which the CSG information, i.e., the CSG Whitelist update, can be included. These two exemplary options are elaborated below.

Figure 6:
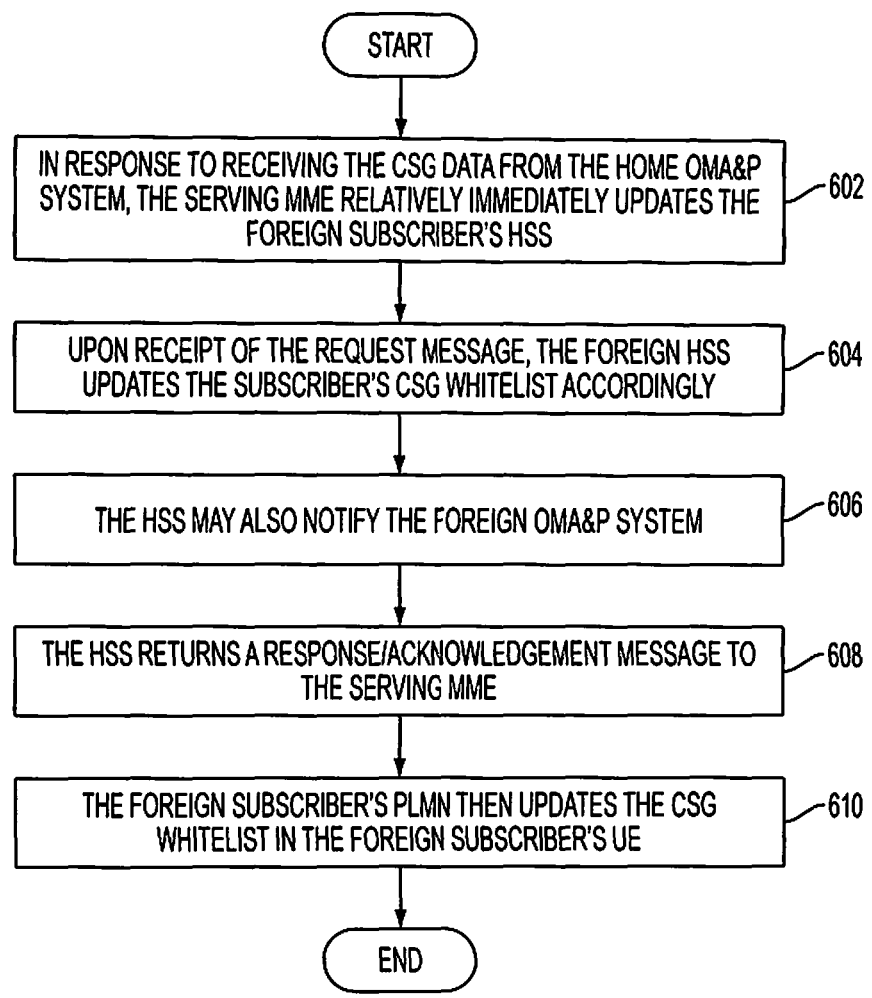
FIGS. 6 and 7 are method flowcharts which illustrate different methods for notifying a foreign home subscriber server (HSS) and a user equipment (UE) of a change according to exemplary embodiments.

In the first exemplary option for performing steps 512 and 514, as shown in the flowchart of FIG. 6, MME 208 updates the foreign HSS 402 relatively immediately using an exemplary S6a Procedure. In response to receiving the CSG data from the home OMA&P system 204, the serving MME 208 relatively immediately updates the foreign subscriber's HSS 402, in step 602, using a exemplary MME-HSS procedure over the S6a interface. This new, exemplary procedure can consist of a request message, e.g., a CSG Whitelist update request message, from the serving MME 208. According to exemplary embodiments, this request message can contain: a subscriber identity, e.g., the IMSI, of the concerned subscriber; the CSG ID of the concerned CSG; and optionally, an indication of whether the update concerns an inclusion or exclusion from the CSG. The subscriber identity may be implicit in the request message. For example, the request message may include information, e.g., a header parameter, that ties the message to a particular context in terms of subscriber or session. Furthermore, the inclusion/exclusion indication may be optional, since this information can be derived from the existing CSG Whitelist that is to be updated. If this CSG Whitelist already contains the concerned CSG ID, then the update is an exclusion, whereas if the CSG Whitelist does not contain the concerned CSG ID, then the update is an inclusion.

According to exemplary embodiments, the request message from the serving MME 208 may also optionally contain the PLMN ID, e.g., consisting of the mobile country code (MCC) and mobile network code (MNC), of the visiting (V) PLMN, i.e., the PLMN 202 of the serving MME 208. However, the foreign HSS 402 typically inherently knows which PLMN 202 the message is received from. Upon reception of the request message, the foreign HSS 402 updates the subscriber's CSG Whitelist accordingly in step 604, may also notify the foreign OMA&P system 404 in step 606 and returns a response/acknowledgement message to the serving MME 208 in step 608. When including a CSG ID from another PLMN 202 in a CSG Whitelist of a subscriber, the HSS 402 stores the PLMN ID (MCC and MNC) of the concerned PLMN 202, i.e., the PLMN 202 to which HeNB 304 connects, together with the HeNB's 304 CSG ID. This storage of multiple types of identification information is performed because the CSG ID is unique only within a single PLMN 202, so the PLMN ID is typically needed to uniquely identify the CSG. The usage of the PLMN ID to make a CSG ID globally unique, and thus stored together with a CSG ID in the CSG Whitelist, is typical for exemplary embodiments (although the PLMN ID may be omitted for CSG IDs of the same PLMN as the HSS and the subscriber belongs to). Note, however that for simplicity of the description the PLMN ID is not explicitly mentioned every time a CSG ID in a CSG Whitelist appears in the descriptions of exemplary embodiments herein.

Returning to the flowchart of FIG. 6, the foreign subscriber's PLMN 404 then updates the CSG Whitelist in the foreign subscriber's UE 414 in step 610. Also the CSG Whitelist in the UE 414 has to include the PLMN ID of PLMN 202 together with any foreign CSG ID. Optionally, the PLMN ID of the PLMN 402 (i.e. the home PLMN of the subscriber associated with the UE) may be omitted for CSG IDs of the PLMN 402 in the CSG Whitelist, since the PLMN ID of the PLMN 402 may be the default PLMN ID.

According to exemplary embodiments, for step 610, if NAS signaling is used for conveying CSG Whitelist updates to the UE 414, or the USIM of the UE 414 denoted herein by "UE/USIM 414", the foreign HSS 402 requests the serving MME 208 to update the concerned UE/USIM 414. This can be performed by, for example, using the Insert Subscriber Data request message to update the serving MME 208 when subscriber data is changed in the foreign HSS 402. The serving MME 208 then can update the CSG Whitelist in the UE/USIM 414 using NAS signaling, e.g., the globally unit temporary identity (GUTI) reallocation procedure or a new NAS procedure optionally preceded by a paging procedure. If a new NAS procedure is to be used, it should consist of a new pair of request-response messages. According to an alternative exemplary embodiment, the serving MME 208 may perform this procedure proactively without waiting for a request from the foreign HSS 402, in which case the request from the foreign HSS 402 can be omitted.

According to another alternative exemplary embodiment, if OMA DM or OTA technology is used to update the CSG Whitelist in the UE/USIM 414, the foreign HSS 402 notifies the OMA&P system 404 of the foreign subscriber's PLMN 408 of the updated CSG Whitelist and the foreign OMA&P system 404 then updates the CSG Whitelist in the UE/USIM 414 using the regular procedure. According to exemplary embodiments, both OMA DM and OTA technology can be used when the concerned UE 414 is attached to another PLMN. At this stage all necessary updates are concluded and then communications service provision can continue according to regular procedures for HeNB 304 access and CSG based access control.

Figure 7:
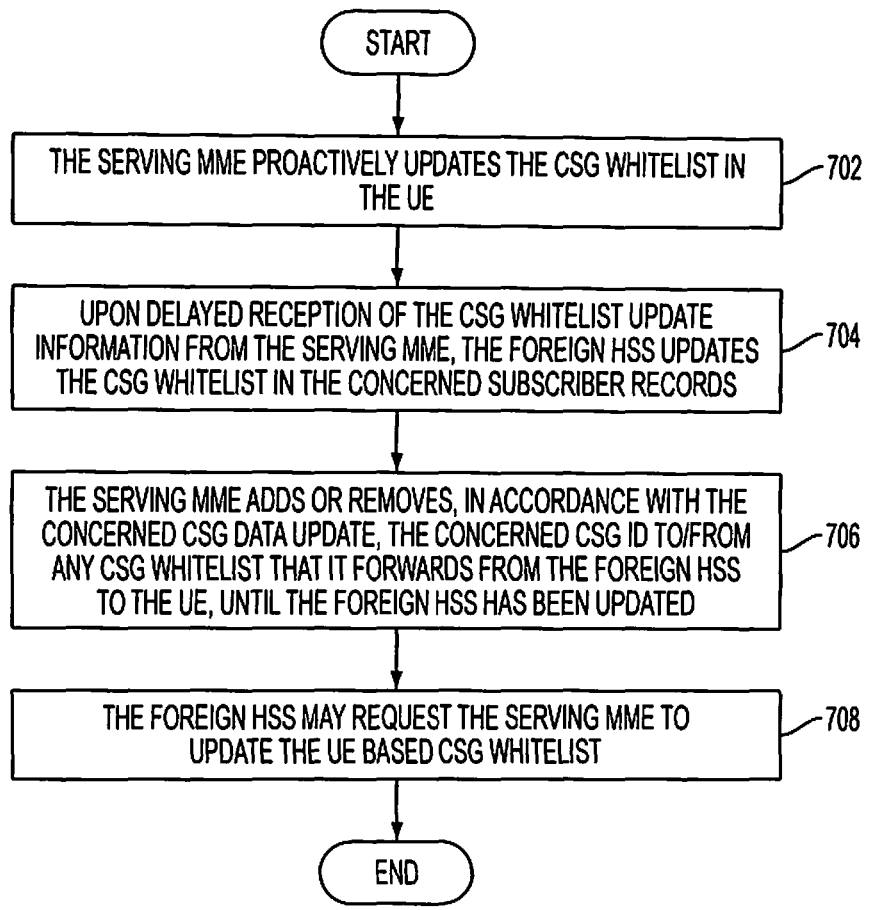

According to another exemplary embodiment for performing steps 512 and 514, as shown in the flowchart of FIG. 7, the serving MME 208 handles processing locally until there is a message to be transmitted to the foreign HSS 402. In this exemplary option, the serving MME 208 does not inform the foreign HSS 402 immediately. Instead the serving MME 208 does proactively, i.e., without waiting for a request from the foreign HSS 402, update the CSG Whitelist in the UE/USIM 414 in step 702 by, e.g., through NAS signaling as described above. This update may be done using a regular procedure, e.g., using the GUTI reallocation procedure, or a new NAS procedure which is optionally preceded by a paging procedure. When the serving MME 208 has a message to send to the foreign subscriber's HSS 402 concerning some other aspect of the foreign subscriber's service, e.g., a Cancel Location Answer message which is sent in response to a Cancel Location Request message which the foreign HSS 402 sends when the UE 414 has registered in another MME, the serving MME 208 includes in the message information about the CSG Whitelist update, e.g., the concerned CSG ID and optionally an indication of inclusion or exclusion in a CSG. Optionally, the serving MME 208 may also include in the message the IMSI of the foreign subscriber and/or the PLMN ID of the VPLMN, i.e., the PLMN 202 of the serving MME 208. However, both these parameters are implicitly known by the foreign HSS 402, since the foreign HSS 402 knows which PLMN 202 the message is sent from and it can derive the IMSI of the subscriber from the transaction context. Optionally, the serving MME 208 may also include in the message an indication of whether the CSG Whitelist in the UE/USIM 414 has already been successfully updated. The serving MME 208 may be allowed to include the CSG Whitelist update information in any MME-to-HSS message or possibly only in the Cancel Location Answer message. Upon delayed reception of the CSG Whitelist update information from the MME 208 (i.e. the MME serving the foreign subscriber in the PLMN he/she is visiting), the foreign HSS 402 updates the CSG Whitelist in the subscriber records of the concerned subscriber accordingly in step 704.

According to exemplary embodiments, before the foreign HSS 402 is updated, the serving MME 208 typically needs to address a synchronization problem, because the foreign HSS 402 may send CSG Whitelist updates to the serving MME 208 to be conveyed to the UE 414. These CSG Whitelist updates from the foreign HSS 402 may be triggered by other CSG data changes from, for example, a CSG belonging to the foreign subscriber's PLMN 408. If such a CSG Whitelist update request from the foreign HSS 402 consists of a complete CSG Whitelist, rather than just indicating the changes to the CSG Whitelist, then this complete CSG Whitelist will not include the most recent update (i.e., the update that the serving MME 208 has not yet indicated to the foreign HSS 402). If the serving MME 208 were to merely forward this CSG Whitelist to the UE 414 to replace the existing UE/USIM 414 based CSG Whitelist, then the CSG Whitelist update that the serving MME 208 previously proactively conveyed to the UE 414 would be erased. Therefore the serving MME 208 should preferably add or remove, in accordance with the concerned CSG data update, the concerned CSG ID to/from any CSG Whitelist that it forwards from the foreign HSS 402 to the UE 414, until the foreign HSS 402 has been updated in step 706.

According to exemplary embodiments, since the foreign HSS 402 knows that the serving MME 208 proactively updates the CSG Whitelist in the UE/USIM 414, the foreign HSS 402 does not have to take any action to update the UE/USIM 414 based CSG Whitelist in response to the CSG Whitelist update information received from the serving MME 208. However, if the above mentioned indication of successful/unsuccessful update of the UE/USIM 414 based CSG Whitelist is used and this indication indicates 'unsuccessful', then the foreign HSS 402 uses regular procedures to trigger such an update. That is, the foreign HSS 402 may request the serving MME 208 to update the UE/USIM 414 based CSG Whitelist in step 708. However, if this request fails again, e.g., because the UE 414 has left the coverage area of the serving MME 208, the foreign HSS 402 can try again to perform this update when the UE 414 subsequently registers in another MME (or re-registers in the same MME).

This exemplary embodiment may, in some cases, be less suitable when OMA DM or OTA technology, instead of NAS signaling, is used for updating of the CSG Whitelist stored in UE 414. In such cases, the serving MME 208 cannot proactively update the CSG Whitelist in the UE/USIM 414. Furthermore, upon reception of the CSG Whitelist update information from the serving MME 208, the foreign HSS 402 should notify the OMA&P system 404 in the foreign subscriber's PLMN 402, so that the foreign OMA&P system 404 can update the UE/USIM 414 based CSG Whitelist. Since the UE/USIM 414 based CSG Whitelist is not proactively updated, there may be a significant delay between a modification to HeNB's 304 CSG and the reflection of this change in the UE/USIM 414 based CSG Whitelist. In the meantime, if the CSG data update was an inclusion of the concerned foreign subscriber, the foreign subscriber has to use manual override of the UE/USIM 414 based CSG Whitelist in order to access the concerned HeNB 304. The CSG based access control will, however work, because the MMEs in the MME pool to which the HeNB 304 is connected (as previously described above) have received up-to-date CSG data from their home OMA&P system 204.

According to some exemplary embodiments, the information that is transferred from the home OMA&P system 204, e.g., the information transferred as shown in step 508, may include only identifiers, e.g., MSISDNs, associated with foreign subscribers that are included in the HeNB's 304 CSG. According to an alternative exemplary embodiment, which is described in more detail below, the home OMA&P system 204 only transfers information indicating new CSG data updates concerning foreign subscribers, i.e., inclusions or removals of foreign subscribers. Since the home OMA&P system 204 selects the MME pool that the HeNB 204 connects to during the installation of the HeNB 304, the home OMA&P system 204 knows to which MME 208 and/or to which MME pool to transfer the CSG data associated with a certain HeNB 304. This exemplary embodiment assumes that the foreign subscriber's UE 414 is currently registered in one of the MMEs in the MME pool to which the HeNB 304 is connected, which means that the UE 414's serving MME 208 is one of the MMEs that receive the updated CSG definition from the home OMA&P system 204.

Figure 8:
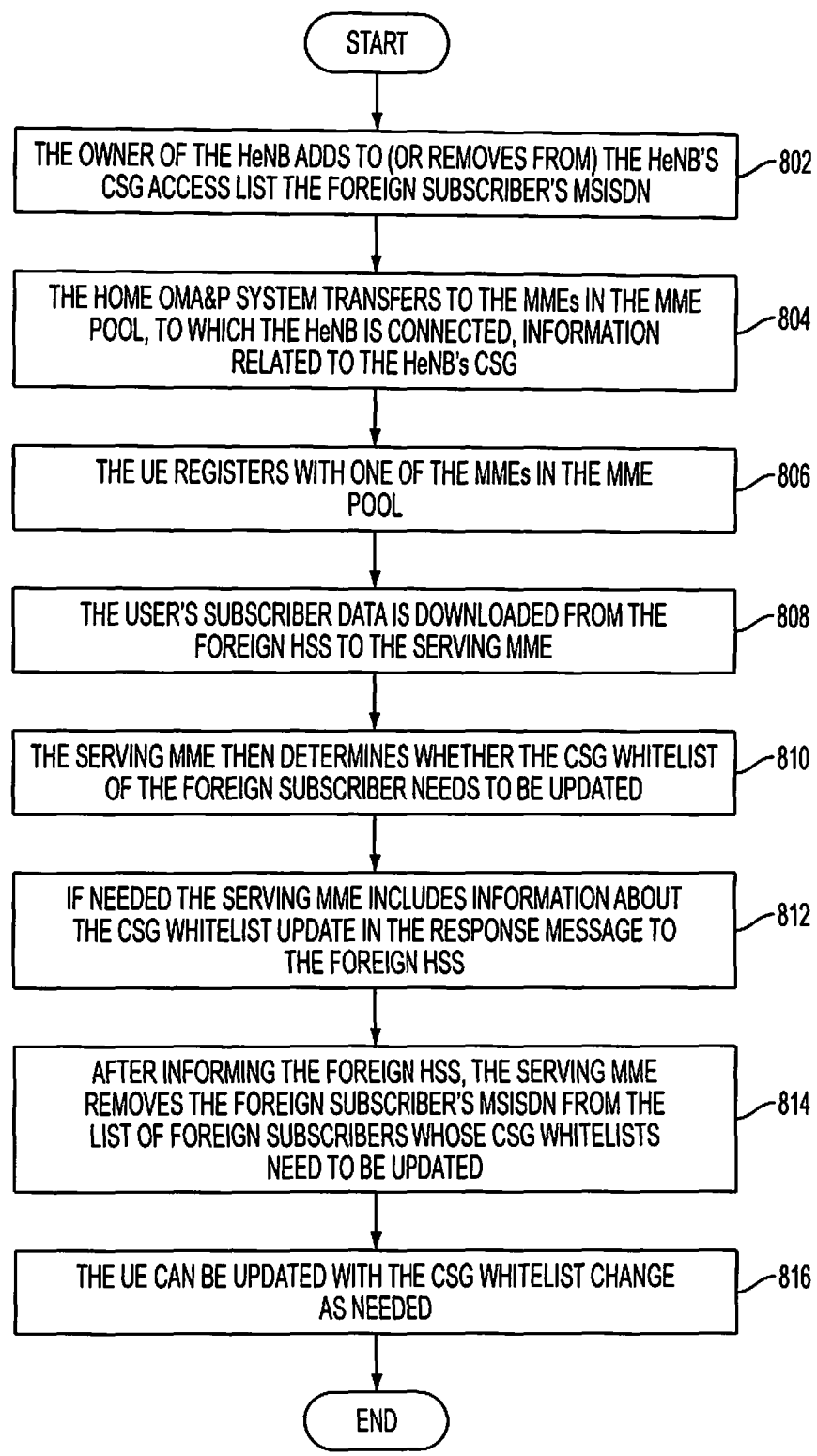
FIG. 8 depicts another method flowchart associated with CSG roaming according to exemplary embodiments.

According to other exemplary embodiments, the UE 414 is not currently registered with any MME from the MME Pool to which the HeNB 304 is connected at the time the UE 414 is added to the HeNB's 304 CSG. Initially, as shown in the flowchart of FIG. 8, the owner of the HeNB 304 adds to (or removes from) HeNB's 304 CSG access list the foreign subscriber's MSISDN in step 802. The owner does this, for example, in an OMA&P entity in the HeNB's operator's OMA&P system 204, e.g., via a web interface shown as dashed line 416. Next, in step 804, the home OMA&P system 204 transfers to the MMEs in the MME pool, to which the HeNB 304 is connected, information related to HeNB's 304 CSG, e.g., the MSISDNs of each subscriber that is included in the CSG, i.e., the CSG access list, or other information that can be used by the MMEs in the MME pool, to determine that the foreign subscriber's MSISDN has been added to (or removed from) HeNB's 304 CSG. This way the home OMA&P system 204 can ensure that the MMEs in an MME pool, e.g., MME 208, always have up-to-date CSG data for the CSGs belonging to the MME pool. This transfer may involve transfer of information between different entities in the home OMA&P system 204, e.g., between an entity receiving and/or storing CSG data and an entity responsible for management of MMEs.

According to exemplary embodiments, an MME 208 may maintain an up-to-date set of CSG data for every CSG of every HeNB 304 that connects to the MME's MME pool, but it may alternatively only maintain the CSG data subset that pertains to foreign subscribers. The CSG data will be kept up-to-date by the home OMA&P system and the MME 208 can use it to check whether the CSG Whitelist of a future visiting foreign subscriber has to be updated. To simplify identification of future visiting foreign subscribers whose CSG Whitelists need to be updated, each MME 208 receiving the updated CSG data preferably checks the received CSG data updates and identifies any MSISDNs of foreign subscribers that are affected by the CSG data update and includes these MSISDNs in a list of foreign subscribers whose CSG Whitelists need to be updated. For each MSISDN in this list, the MME 208 also notes the concerned CSG ID and the type of update. If the MME 208 uses such a list of foreign subscribers whose CSG Whitelists need to be updated, it need not maintain the complete list of CSG data for foreign subscribers.

At some later point in time, the concerned foreign subscriber roams into the service area of the concerned MME pool associated with HeNB 304. The foreign subscriber's UE 414 may do this with the intention of accessing the concerned HeNB 304 (which is located within the service area of the MME pool), but the UE 414 will in any case first be registered with the MME 208 via a macro cell (because the CSG Whitelist in the UE 414 is not updated). When the UE 414 registers with one of the MMEs in the MME pool in step 806, his/her subscriber data (including the CSG Whitelist and the MSISDN) is downloaded from the foreign HSS 402 to the serving MME 208 in step 808 via a message, e.g., in an Insert Subscriber Data Request message (or other corresponding message). The serving MME 208 then determines whether the CSG Whitelist of the foreign subscriber needs to be updated in step 810.

According to exemplary embodiments, if the serving MME 208 relies on using complete lists of foreign subscribers for its CSGs, the serving MME 208 performs two checks. First, the serving MME 208 checks whether the MSISDN of the foreign subscriber is included in any received complete list of foreign subscribers for any of the CSGs belonging to the MME's 208 MME pool. If the foreign subscriber's MSISDN is found in such a list, the serving MME 208 checks whether the CSG ID associated with the list is included in the foreign subscriber's CSG Whitelist with the correct PLMN ID indication. If this is not the case, the MME 208 determines that the foreign subscriber's CSG Whitelist needs to be updated and that the concerned CSG ID should be included in the CSG Whitelist. Second, the MME 208 checks whether the CSG ID of any of the MME pool's CSGs is included in the foreign subscriber's CSG Whitelist. If this is the case, the MME 208 checks whether the MSISDN of the foreign subscriber is indeed included in the list of foreign subscribers for the concerned CSG. If this is not the case, the MME 208 determines that the foreign subscriber's CSG Whitelist needs to be updated and that the concerned CSG ID (and associated PLMN ID) should be removed from the CSG Whitelist.

If according to exemplary embodiments, the MME 208 instead relies on a list of foreign subscribers whose CSG Whitelists need to be updated, the MME 208 checks if the MSISDN of the visiting foreign subscriber is included in this list. If this is the case, the MME 208 further checks whether the foreign subscriber's CSG Whitelist still needs to be updated according to the data, for example the CSG ID and update type, in the list. If the MME 208 (aided, as described above, either by the complete lists of foreign subscribers for CSGs or by a list of foreign subscribers whose CSG Whitelists need to be updated) has determined that the CSG Whitelist of a visiting foreign subscriber needs to be updated, the serving MME 208 includes information about the CSG Whitelist update in the response message, e.g., an Insert Subscriber Data Answer message, to the foreign HSS 402 in step 812. The CSG Whitelist update information may contain the CSG ID of the concerned CSG and optionally an indication of the type of update. The identity, e.g., the IMSI, of the concerned subscriber does not have to be included, since this is known from the transaction context. The type of update can be optional, because the foreign HSS 402 can derive this update from the contents of its stored version of the CSG Whitelist. If the stored CSG Whitelist already includes the indicated CSG ID, then the update is a removal of a foreign subscriber, whereas if the CSG ID is not included in the stored CSG Whitelist, the update is an inclusion of a foreign subscriber.

After informing the foreign HSS 402, the serving MME removes the foreign subscriber's MSISDN (and the associated data) from the list of foreign subscribers whose CSG Whitelists need to be updated in step 814. Additionally, the UE 414 can be updated with the CSG Whitelist change as needed in step 816. In order to make the other MMEs in the MME pool remove their corresponding (now redundant) data, the serving MME 208 may inform the home OMA&P system 204 that the foreign HSS 402 has been updated and the home OMA&P system 204 may in turn inform the other MMEs in the MME pool, so that they can remove the redundant data. According to an alternative exemplary embodiment, a (generic) data synchronization mechanism among the MMEs in the MME pool may be used. However, if none of these methods for removal of the redundant data is used, another MME in the MME pool will remove its redundant data if the concerned foreign subscriber later registers in the MME and the MME concludes that the CSG Whitelist of the foreign subscriber has already been updated.

Upon reception of the CSG Whitelist information, the foreign HSS 402 takes appropriate actions as previously described. That is, it updates the stored CSG Whitelist in the subscriber data accordingly and, if OMA DM or OTA technology is used for conveying CSG Whitelist updates to the UE/USIM 414, the foreign HSS 402 notifies the foreign OMA&P system 404 of the update. If NAS signaling is used for conveying CSG Whitelist updates to the UE/USIM 414, the foreign HSS 402 may request the serving MME 208 to transfer the CSG Whitelist update the UE/USIM 414, but there is also an option to let the serving MME 208 do this proactively (without explicit request from the foreign HSS 402), in which case the foreign HSS 402 does not have to request the serving MME 208 to do it. If the serving MME 208 uses the option to proactively update the UE/USIM 414, it may also include an indication of whether the UE/USIM 414 has been successfully updated in the CSG Whitelist update information sent to the foreign HSS 402.

Figure 9:
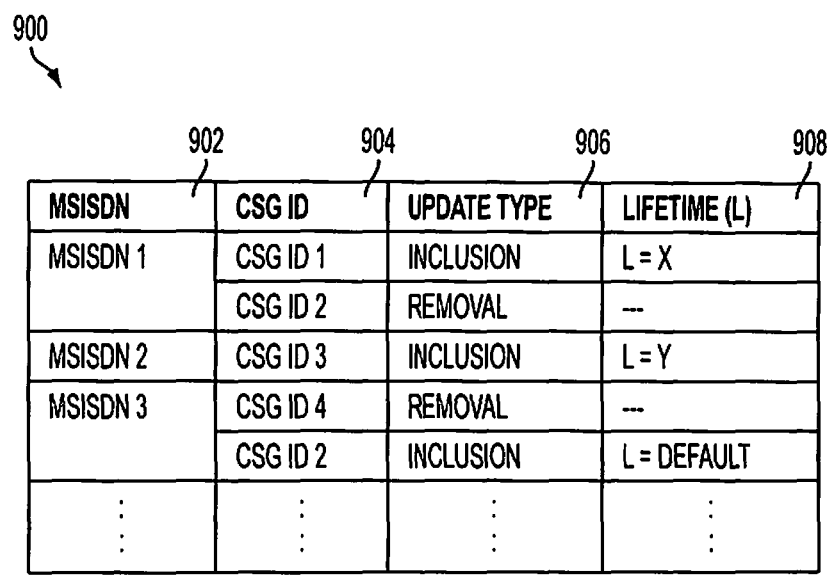
FIG. 9 shows a list for storing CSG Whitelist information associated with exemplary embodiments.

If the serving MME 208 relies on a list of foreign subscribers whose CSG Whitelists need to be updated and, when comparing the foreign subscriber's CSG Whitelist with the data in the list of foreign subscribers whose CSG Whitelists need to be updated finds, that the CSG Whitelist has already been updated (presumably by another MME in the same MME pool), then the serving MME 208 removes the foreign subscriber's MSISDN (and the associated data) from the list of foreign subscribers whose CSG Whitelists need to be updated and continues with regular procedures. According to a purely illustrative example, an exemplary data structure 900 for tracking the list of foreign subscribers whose CSG Whitelists need to be updated is shown in FIG. 9. The exemplary data structure can track each update uniquely by the subscriber's MSISDN 902, the CSG ID 904 to be changed, the update type 906, e.g., an inclusion or a removal from the identified CSG for the subscriber, and a lifetime 908 which can be time period used for inclusion into a CSG.

According to another exemplary embodiment, CSG Whitelist information can be changed by the HeNB 304 owner when the HeNB 304 is disconnected e.g., when the owner goes away on vacation or even every night (if the owner is conscious about the consumed power). In this exemplary case, when the HeNB 304 is disconnected from the PLMN 202, there is no defined MME pool associated with HeNB 304. However, since the home OMA&P system 204 selects the MME pool to which the HeNB 304 should connect, the home OMA&P system 204 may store this configuration information. This allows the home OMA&P system 204 to ensure that the HeNB 304 connects to the desired MME pool when the HeNB 304 reconnects to the core network (which the HeNB 304 should do as long as the HeNB 304 has not been moved out of the service area of the MME pool that it was previously connected to). Hence, the home OMA&P system 204 may transfer CSG data updates to the MMEs of the MME pool to which the HeNB 304 was previously connected. Note also that a previous serving MME 208 may also keep the CSG data updates, e.g., a list of foreign subscribers whose CSG Whitelists need to be updated that it has received from the home OMA&P system 204, even if the concerned HeNB 304 has been disconnected. If a concentrator node, e.g., HeNB GW 308, is used between the HeNBs and the MME pool, the MMEs will not necessarily even know when an HeNB 304 is disconnected.

However, according to other exemplary embodiments, an HeNB 304 may be moved while disconnected. Since these home base stations are smaller, more portable and designed to enable users to set them up, is anticipated that some home base stations could be relocated somewhat frequently. After being turned on in a new location, the HeNB 304 will inform the home OMA&P system 204 of its new location, which the HeNB 304 detects by scanning broadcasts from the macro layer cells, so that the home OMA&P system 204 can assign a suitable MME pool to the HeNB 304. When the HeNB 304 is assigned to a new MME pool, the home OMA&P system 204 cannot rely on transferring only the changed parts of the CSG data to the MMEs, because there may be previous changes pending to be reflected in CSG Whitelists of foreign subscribers which would then be lost. Therefore, when assigning an HeNB 304 to a new MME pool, the home OMA&P system 204 according to this exemplary embodiment provides information to the MMEs in the pool for use to track all pending updates to be reflected in CSG Whitelists of foreign subscribers. This information can be different depending on whether the receiving MMEs rely on complete lists of foreign subscribers for the MME pool's CSGs on a list of foreign subscribers whose CSG Whitelists need to be updated.

According to exemplary embodiments, if an MME 208 relies on complete lists of foreign subscribers for the MME pool's CSGs, the home OMA&P system 204 transfers the complete CSG definition, or preferably only the subset of the CSG data consisting of foreign subscribers, i.e., the MSISDN of each foreign subscriber in the CSG, to the serving MME 208. The serving MME 208 can immediately start using the received data as a list of foreign subscribers for the new CSG in the manner described above with respect to the exemplary embodiments associated with having the serving MME 208 delay informing the foreign HSS 402 until a follow on message is to be sent. If an MME 208 relies on a list of foreign subscribers whose CSG Whitelists need to be updated, the home OMA&P system 204 instead transfers explicit information about all pending CSG Whitelist updates involving the concerned CSG, for example, updates in the CSG data which have not yet been reflected in the affected foreign subscribers' CSG Whitelists. However, since the home OMA&P system 204 does not handle these CSG Whitelist updates itself, but relies on the MMEs to perform them, the home OMA&P system 204 does not know which updates are still pending.

According to exemplary embodiments, in order to determine which updates are still pending the home OMA&P system 204 has to check with the MMEs of the old MME pool which was previously assigned to the HeNB 304. Note that the home OMA&P system 204 typically has to check with all the MMEs of the old MME pool but that only the CSG Whitelist updates that are both related to the concerned CSG, and that are still pending in all these MMEs, should be regarded as still pending. If an update for instance is pending in all but one of the MMEs in the MME pool, but has been removed from the list of foreign subscribers whose CSG Whitelists need to be updated and in the last MME, this means that the last MME has already performed the update and that the update consequently no longer is pending in this context. When the home OMA&P system 204 has retrieved information about all of the pending CSG Whitelist updates related to the concerned CSG from the old MME pool, the home OMA&P system 204 transfers this information to the new MME(s) for inclusion in each MME's respective list of foreign subscribers whose CSG Whitelists need to be updated. The MMEs in the old MME pool may then remove this no longer needed information. According to exemplary embodiments, various methods can be used to efficiently manage various MMEs which are relying on lists of foreign subscribers whose CSG Whitelists need to be updated. For example, according to one exemplary embodiment, a garbage collection principle with a mandatory lifetime for foreign subscribers' CSG memberships can be used as described below.

According to another exemplary embodiment, the home OMA&P 204 system may, instead of obtaining information about pending updates, transfer a temporary complete list of foreign subscribers in the concerned CSG to a new MME (or MME pool) which relieves the home OMA&P system 204 from the task of collecting pending CSG Whitelist updates from the old MME pool. When this exemplary option is used, an MME 208 that receives a list of foreign subscribers for a new CSG starts a timer which expires when a time period equal to the longest allowed lifetime for a foreign subscriber's membership in a CSG has elapsed. In the meantime, the MME 208 uses the received temporary list in the manner described above for exemplary embodiments associated with an MME 208 which relies on complete lists of foreign subscribers for the MME pool's CSG, with the difference that the MME 208 may remove from the temporary list of foreign subscribers in the CSG any foreign subscriber, i.e., the MSISDN of the foreign subscriber, whose membership lifetime expires or whose CSG Whitelist has been confirmed to be updated.

According to exemplary embodiments, when the timer expires, the MME 208 knows that there are no more pending exclusions related to the new CSG and can switch to its regular behavior, according to exemplary embodiments described above, for the new CSG, i.e., relying on its list of foreign subscribers whose CSG Whitelists need to be updated. When doing this, the serving MME 208 should transfer any remaining foreign subscribers in the temporary list of foreign subscribers for the new CSG to the list of foreign subscribers whose CSG Whitelists need to be updated and indicate them as inclusion type updates. While the timer is still running, the MME may receive inclusion updates, concerning the new CSG, from the home OMA&P system 204, including inclusion updates whose purpose is to refresh the CSG membership of a subscriber. Additionally, the foreign subscribers that these inclusions concern are typically included in the temporary list of foreign subscribers for the new CSG. Therefore there may be remaining foreign subscribers in the temporary list even when the timer, which was set equal to the longest allowed CSG membership lifetime for a foreign subscriber, has elapsed. According to exemplary embodiments, an alternative procedure, which does not require different actions depending on whether the HeNB reconnects to the expected MME pool or a new one, would be that the OMA&P system keeps a note of the CSG data to be sent, awaiting the HeNB's reconnection to the core network and can then, when the HeNB has again connected to an MME pool, send the CSG data to the MMEs of this MME pool.

According to an exemplary embodiment, one method for reducing or controlling the amount of information to be stored and transmitted is to transmit only minimal CSG data from the home OMA&P System 204 to the MME 208 and the associated MME pool. In order to minimize the amount of data transferred from the home OMA&P system 204 to the serving MME 208, the serving MME 208 can maintain a list of foreign subscribers whose CSG Whitelists need to be updated and the home OMA&P system 204, based on this list, may only send the data that is needed for the MME 208 to the MME 208. That is, in some exemplary embodiments, the home OMA&P system 204 typically only transfers information about updates concerning foreign subscribers, e.g., inclusions of foreign subscribers in CSG data or removals of foreign subscribers from CSG data, to the serving MME 208. For the exemplary case of connection to a new MME pool, the home OMA&P system 204 will typically transfer either a complete list of foreign subscribers for the concerned CSG or the accumulated pending updates concerning foreign subscribers for the concerned CSG to the MME pool.

According to another exemplary embodiment, manual override of the UE 414 based CSG Whitelist can be performed. For example, manual override of the UE 414 based CSG Whitelist for attempting to access an HeNB 304 whose CSG ID should be included in the CSG Whitelist but with which the UE 414 based CSG Whitelist has not yet been updated, should be seen as a last resort use. However, there are at least three exemplary cases when this last resort typically may be useful. According to one exemplary embodiment, manual override may occur when there is no other way for the foreign UE 414 to connect to the network 202 other than via the concerned CSG cell associated with the HeNB 304 which can occur when there is no macro layer coverage.

According to another exemplary embodiment, manual override may occur when the HeNB 304 is located at the border between two MME pools and the foreign UE 414, whose CSG Whitelist needs to be updated in order to avoid manual override, is located in the part of the HeNB 304 coverage area which is covered by a macrocell belonging to another MME pool than the one the HeNB 304 is connected to. In this situation the UE's 414 serving MME 208 has not received the data from the home OMA&P system 204 that is needed to enable the update and manual override may be acceptable.

According to another exemplary embodiment, manual override may occur when the CSG Whitelists of the UE 414 and the foreign HSS 402 for some reason are erroneously out of synchronization and the entity/entities responsible for updating the UE 414 based CSG Whitelist is/are not aware of it and therefore does/do not attempt to update the UE 414. This can result in the foreign subscriber having been added to the CSG definition, which is reflected in the subscriber's CSG Whitelist in the foreign HSS 402. However this update to the CSG definition is not reflected in the CSG Whitelist stored in the UE 414. Without manual override this situation may lead to the UE 414 being unable to access the home PLMN 202.

According to exemplary embodiments, another method for improving efficiency in the network(s) is to control the potential for accumulated updates for the same foreign subscriber. For example, if the UE 414 of the foreign subscriber is not registered in the MME pool covering the concerned HeNB 304 when the CSG definition is updated, several updates related to the foreign subscriber may occur and "accumulate" before the CSG Whitelist of the foreign subscriber is updated. This may include updates in the same CSG, different CSGs in the same MME pool and/or updates in CSGs belonging to different MME pools. Updates related to CSGs in different MME pools do not affect each other, but updates related to CSGs in the same MME pool do, in particular updates related to the same CSG. If the home OMA&P system 204 transfers to the MME pool upon every update the complete CSG data, or the subset of the CSG data which only identifies the foreign subscribers that are included in the CSG, then each received set of CSG data simply replaces the previous set for the same CSG in the MME 208. The newest CSG data will contain all accumulated updates. However, if the home OMA&P system 204 only transfers the MSISDN of the concerned foreign subscriber and an indication of the type of update (inclusion or removal), the situation can become slightly more complex.

According to exemplary embodiments, if the updates relate to different CSGs (in the same MME pool), the MME 208 simply stores each update separately in its list of foreign subscribers whose CSG Whitelists need to be updated. Optionally, the MME 208 may compress the list somewhat by storing only a single entry for each foreign subscriber, keyed by, for example, the MSISDN, in which all accumulated updates related to the same or different CSGs are recorded. If the accumulated updates are related to the same CSG, the MME 208 has two alternative exemplary options for how to process the accumulated updates. In a first exemplary option, the MME 208 chooses to treat the accumulated updates in the same manner as updates related to different CSGs in the same MME pool. In this case, the MME 208 ensures that the chronological order of the accumulated updates is recorded, so that the net result of applying them becomes correct. In a secondary exemplary alternative option the MME 208 lets inclusions and removals concerning the same foreign subscriber and the same CSG cancel out each other. That is, if the MME 208 has a an inclusion update stored in the list and a removal update concerning the same foreign subscriber and CSG is received from the home OMA&P system 204, then the removal cancels the inclusion. Hence the old update can be removed from the list without replacing it with the removal, i.e., after clearing the list from these items the MME 208 can simply forget about both updates. Similarly, if the MME 208 has a removal stored in the list and an inclusion concerning the same foreign subscriber and CSG is received from the home OMA&P system 204, then the MME 208 can delete the removal from the list without including the inclusion in the list and then forget about both updates.

As described above, it is possible that the CSG Whitelists in the foreign HSS 402 and the foreign UEs 414 keep growing. For example, if a visiting subscriber is added to a CSG in a VPLMN then later leaves the VPLMN and never returns to the VPLMN, the CSG ID of the foreign CSG could remain indefinitely in the foreign HSS 402, even if the CSG owner removes the foreign subscriber from the CSG data. Similarly, CSG data update information may remain indefinitely in the MMEs 208. Even though it is unlikely that a harmful amount of data will accumulate this way, it can be useful to have a so called "garbage collection" mechanism which removes outdated CSG related data from the MMEs 208 and from the CSG Whitelists in the foreign HSS 402 and the UEs 414. According to exemplary embodiments a lifetime, expressed either as an absolute or a relative time, can be associated with a CSG ID from a foreign CSG when it is included in a CSG Whitelist. If the HeNB 304 owner specifies a lifetime, then this lifetime should be used, otherwise a default lifetime should be used. The default lifetime should preferably be standardized, but it could also be set by the home OMA&P system 204 receiving the lifetime-less foreign MSISDN from the HeNB 304 owner. This lifetime can be included in the CSG Whitelist in the foreign HSS 402 and in the UE 414 as well as in the CSG data update information sent from the home OMA&P system 204 to the MME 208 (and the other MMEs in the same MME pool). When the lifetime expires, the associated data is removed from the CSG Whitelist both in the foreign HSS 402 and in the UE 414. Additionally any remaining CSG data update information in MMEs 208 is also removed as desired.

According to exemplary embodiments, the home OMA&P system 204 is also aware of the lifetime and when this lifetime expires, assuming the HeNB 304 owner has not previously removed the foreign subscriber from the CSG data, the home OMA&P system 204 has two different courses of action. If the lifetime was specified by the HeNB 304 owner, the concerned foreign subscriber is simply removed from the CSG data, i.e., the concerned foreign subscriber is removed from the CSG subscriber list. If a default lifetime was used in absence of a lifetime specified by the HeNB 304 owner the home OMA&P 204 system reinserts the foreign subscriber into the CSG data with a restarted default lifetime, i.e., in essence the home OMA&P system 204 "refreshes" the foreign subscriber's membership in the CSG, and sends this CSG data update information to the MMEs in the MME pool owning the CSG. The CSG Whitelists in the foreign HSS 402 and the UE 414 of the foreign subscriber will then subsequently be updated as described in the exemplary embodiments above.

This exemplary approach may cause another potential synchronization issue to be dealt with. For example, if an MME 208 receives the CSG data update information concerning the reinserted/refreshed foreign subscriber slightly before the concerned CSG ID is removed from the foreign subscriber's CSG Whitelist and the foreign subscriber is registered in the MME 208 when the MME 208 receives the information, then the MME 208 may conclude that the foreign subscriber's CSG Whitelist does not need to be updated. The MME 208 may come to this conclusion because the concerned CSG ID is already present in the CSG Whitelist and may consequently delete the CSG data update information. Soon thereafter, possibly very soon thereafter, the CSG Whitelist of the foreign subscriber is updated with the removal of the concerned CSG ID due to, for example, the expiration of the lifetime, and thereby synchronization of the data in the CSG data and in the foreign subscriber's CSG Whitelist has failed. According to exemplary embodiments this problem can be eliminated by including the lifetime both in the CSG Whitelist sent from the foreign HSS 402 to the serving MME 208 and in the CSG data update information sent from the home OMA&P system 204 to the serving MME 208. The serving MME 208 would then not only check the presence or absence of the concerned CSG ID in the CSG Whitelist, but the serving MME 208 can also check whether the lifetimes match. If the lifetimes do not match, which they will not do if the foreign subscriber has been reinserted/refreshed, the serving MME 208 concludes that the CSG Whitelist has to be updated, although only with a new lifetime for the concerned CSG ID in this exemplary case.

However, according to exemplary embodiments, if the timing mismatch is instead the other way around, i.e., if the CSG Whitelist of the foreign subscriber visiting the serving MME 208 is updated with the removal of the concerned CSG ID due to lifetime expiration before the serving MME 208 receives the CSG data update information from the home OMA&P system 204, then the serving MME 208 will not allow the foreign subscriber's UE 414 to access the concerned HeNB 304, not even after manual override of the CSG Whitelist in the UE 414. This denial of access lasts until the serving MME 208 receives the CSG data update information from the home OMA&P system 204, so that the foreign subscriber's CSG Whitelist can be updated. Even though this denial of access situation is likely to persist for only a very short time, since the timing mismatch causing it is likely to be small, it would be desirable to avoid the timing mismatch completely.

According to exemplary embodiments, a solution which serves to avoid both of the above described timing misalignment problems is that the home OMA&P system 204 sends the CSG data update information to the MMEs 208 in the concerned MME pool slightly before the default lifetime expires. This CSG data update information is sent with (explicit or implicit) instructions to keep the information for a minimum time, even if the CSG Whitelist of the concerned foreign subscriber does not seem to need updating. This allows for the CSG data update information to be kept until after the default lifetime has expired and the concerned CSG ID has been removed from the CSG Whitelist due to the expiration of the lifetime. The desired result is that if the foreign subscriber registers in one of the MMEs 208 in the concerned MME pool before the concerned CSG ID has been removed from the CSG Whitelist, due to the lifetime expiration, and the MME 208 concludes that the CSG Whitelist need not be updated, e.g., assuming that the above described exemplary lifetime-only-update method is not used, then the MME 208 does not delete the CSG data update information. Instead the MME 208 keeps the CSG data update information in accordance with the instructions from the home OMA&P system 204.

When the concerned CSG ID soon afterwards is removed from the CSG Whitelist due to, for example, the lifetime expiration, the MME 208 concludes that the CSG Whitelist needs to be updated in accordance with the retained CSG data update information. Therefore, the MME 208 ensures that the CSG Whitelist is updated in the previously described manner. After updating the CSG Whitelist, the MME 208 deletes the CSG data update information. However, if the minimum time that the home OMA&P system 204 has instructed the serving MME 208 to keep the CSG data update information expires and the serving MME 208 has not updated the CSG Whitelist during this time because, for example, the foreign subscriber has not been registered in the MME 208 during this time, the MME 208 can keep the CSG data update information and treat the information in the exemplary methods described above for other CSG data update information.

According to another exemplary embodiment, a CSG may potentially be served by multiple CSG cells belonging to more than one MME pool, e.g., an enterprise CSG or a CSG for Starbuck's or McDonald's customers. The above described exemplary embodiments are however, in principle, not affected by this. The home OMA&P system 204 still knows which MME pools that the concerned CSG belongs to and can transfer the CSG data, or CSG data update information, to the MMEs in all these MME pools. A consideration is that an MME pool internal data synchronization mechanism, for removing redundant CSG data update information, which is described herein as an optional alternative exemplary embodiment, typically cannot be used in cases where the synchronization mechanism would not span across multiple MME pools.

According to another exemplary embodiment, the MME 208 serving a foreign subscriber can request the CSG data from the home OMA&P system 204 when needed, instead of having the home OMA&P system 204 pushing CSG data to the MMEs of the concerned MME pool. For example, when a foreign subscriber registers through UE 414 with an MME 208 in a VPLMN, i.e., a PLMN 202 which is not the foreign subscriber's home PLMN, the MME 208 requests CSG subscriber list data related to the foreign subscriber from the OMA&P system 204 of the MME's PLMN 202, i.e., the VPLMN. The CSG subscriber list data the serving MME 208 retrieves from the OMA&P system 204 may be different from the data transferred (pushed) from the OMA&P system 204 in the exemplary embodiments described above. Instead of being data associated with a certain CSG in the MME pool, the retrieved data may consist of the CSG IDs of all the CSGs in the PLMN 202, i.e., the VPLMN from the foreign subscriber's point of view, in which the foreign subscriber's MSISDN (or possibly IMSI) is included. To support such requests from MMEs, the OMA&P system 204 would, conceptually, although the actual implementation may vary as would be understood by one skilled in the art, maintain a database of CSG data for foreign subscribers, keyed by the MSISDN (or possibly IMSI) of the foreign subscribers. That is, when the MME 208 requests data, it includes the MSISDN (or possibly IMSI) of the foreign subscriber, the OMA&P system 204 retrieves from a database and returns to the MME 208 the CSG IDs of all the CSGs in the PLMN in which the foreign subscriber is a member. That is, the OMA&P system in essence returns a VPLMN-CSG Whitelist, i.e. a CSG Whitelist containing only CSG IDs belonging to the concerned PLMN, associated with the foreign subscriber.

The CSG data that the serving MME 208 transfers to the foreign subscriber's HSS 402 and (in some variants) to the foreign subscriber's UE 414 in order to update the CSG Whitelist is also different in this exemplary embodiment than in other exemplary embodiments described herein. In this exemplary embodiment, the MME 208 transfers the complete set of CSG IDs received from the OMA&P system 204 (optionally accompanied by the PLMN ID of the MME 208 although this is known by the foreign HSS 402 and the UE 414) to the foreign HSS 402 and/or the UE 414 in which the foreign subscriber is a member. The receiver of this CSG data, the foreign HSS 402 and/or the UE 414, may thus replace the set of CSG IDs of the concerned VPLMN which was previously stored in the CSG Whitelist with the received set of CSG IDs. This replacement takes care of both inclusion and removal type of updates.

According to exemplary embodiments, the serving MME 208 stores the retrieved CSG data in the foreign subscriber's context, i.e., the data related to the foreign subscriber, in the MME 208 and keeps it as long as the foreign subscriber remains registered in the serving MME 208. The CSG data is not only used for CSG Whitelist updating, but the serving MME 204 also uses it for CSG based access control when the foreign subscriber accesses the network through a CSG cell.

According to another exemplary embodiment, an alternative trigger of the MME's 208 CSG data retrieval from the OMA&P system 204 is that a foreign subscriber uses manual override of its CSG Whitelist to force an access attempt in a CSG cell whose broadcast CSG ID is not included in the foreign UE's 414 CSG Whitelist. This access attempt can trigger the above described behavior in the serving MME 208. In this case the serving MME 208 would fetch the CSG data related to the foreign subscriber from the home OMA&P system 204 (i.e. the OMA&P system of the MME's PLMN), update the CSG Whitelist in the foreign HSS 402 and (in some variants) in the foreign UE 414. If the retrieved CSG data indicates that the foreign subscriber is indeed a member of the CSG of the CSG cell, the serving MME 208 would also accept the foreign UE's 414 access attempt.

In order to capture changes of the relevant CSG data done in the home OMA&P system 204 while the foreign subscriber remains registered in the serving MME 208, the serving MME 208 could periodically, or when triggered by UE 414 events such as a tracking area update (TAU), retrieve new CSG data from the home OMA&P system 204. If the UE 414 registers in a new MME in the same VPLMN, this would also trigger the new MME to start the above described behavior, which would result in a new, possibly redundant, update of the foreign subscriber's CSG Whitelist. However, this does not cause any harm since two equivalent sets of CSG IDs would simply replace each other in the CSG Whitelist. When the foreign subscriber's UE 414 leaves the VPLMN, or when it registers in another PLMN, the HSS 402 and the UE 414 may optionally delete the CSG IDs of the VPLMN from the CSG Whitelist. This is possible, since the CSG Whitelist is updated with the complete list of CSG IDs of allowed CSGs in the VPLMN whenever the foreign subscriber registers in the VPLMN again.

According to the above described exemplary embodiments the above described problems in conjunction with CSG roaming related to the lack of inter-PLMN interfaces for support of management of CSG subscriber lists and CSG Whitelists can be overcome. Thereby, the exemplary embodiments allow subscribers from other PLMNs to be temporary or permanent members of a CSG in another network. Exemplary scenarios include, but are not limited to, e.g., that a HeNB 304 owner temporarily allows a visitor from abroad access to his/her HeNB 304 or that the users such as, for example, family members, regularly using the HeNB 304 can have their respective subscriptions with different PLMN operators, assuming that national roaming is supported as in the United States. For example, another exemplary enabled scenario describes that an international enterprise may define CSGs in all its subsidiaries, served by different operators (in different nations), but still include all employees (worldwide) in all the different CSGs, so that all employees can access the company's HeNBs 304 irrespective of branch or country.

Two Whitelists

According to exemplary embodiments, CSG roaming can be performed without inter-PLMN interworking and cooperation between PLMNs. In these exemplary embodiments, each UE 414 has two CSG Whitelists, one related to its Home PLMN (HPLMN) and one related to Visited PLMN(s) (VPLMN(s)). The HPLMN CSG Whitelist is maintained as described above, e.g., stored in the home HSS per subscriber, for example, by IMSI, and sent to the subscriber's UE 414 for storage when modified. The serving MME 208 receives the CSG Whitelist from the home HSS 412 and can then perform access control when UE 414 performs an access in a CSG cell in the HPLMN 202. The VPLMN CSG Whitelist is not stored in this HSS 412. Rather, MMEs receive information about visiting subscribers/UEs and their allowed CSGs from an OMA&P system 204 that is operated by the same network operator 202 that operates the MMEs, e.g., when a visiting UE 414 accesses the network from a CSG cell, the serving MME 208 performs access control based on information received from the home OMA&P system 204 about which visiting subscriber/UE 414 that has access right in the particular CSG cell.

According to exemplary embodiments as described above, an HeNB 304 owner may add to (or remove from) a CSG subscriber list a foreign subscriber's MSISDN. The owner may do this using an OMA&P entity in the HeNB operator's OMA&P system 204, e.g., via a web interface. How this CSG subscriber list data is handled for foreign subscribers is described in the exemplary embodiments below. This handling may involve transfer of information between different entities in the OMA&P system 204, e.g., between an entity receiving and/or storing CSG subscriber list data and an entity responsible for management of MMEs.

According to another exemplary embodiment, the home OMA&P system 204 can push CSG subscriber list data concerning foreign subscribers to MMEs in the HPLMN 202. The home OMA&P system 204 provides, to the MMEs in the MME pool to which the HeNB 304 is connected, the updated CSG subscriber list, or possibly only changes to the subscriber list and, potentially, information identifying access time limitations. As described above, because the exemplary embodiments relate primarily to foreign subscribers, the home OMA&P system 204 typically restricts the transferred CSG subscriber list data to the subset of the CSG subscriber list data concerning foreign subscribers and possibly only transferring the specific updates of this data subset. Since the home OMA&P system 204 selects the MME pool the HeNB 304 connects to during the installation of the HeNB 304, the home OMA&P system 204 knows to which MMEs, i.e., to which MME pool, to transfer the CSG data associated with a certain HeNB 304. Exemplary methods for sending this CSG related information from the home OMA&P system 204 to the MMEs, e.g., serving MME 208, and exemplary methods for managing this information in the MMEs are described above.

According to exemplary embodiments, when a foreign UE 414 accesses one of the MMEs in the concerned MME pool in the VPLMN, from a non CSG cell, the MME 208 handling the access would recognize that this is a foreign UE 414 and checks the CSG subscriber list data the MME 208 received from the home OMA&P system 204. If the UE 414 is found to be allowed on a CSG, e.g., an identifier associated with the UE 414 is included in a CSG subscriber list received from the home OMA&P system 204, the serving MME 208 would send an update to the UE 414 in order to update the VPLMN CSG Whitelist in the UE 414, i.e., the serving MME 208 would send the CSG ID of the concerned VPLMN CSG to the UE 414 via, for example, NAS signaling. The UE 414 can then store the CSG ID and the PLMN ID, which consists of the MCC and the MNC, in its VPLMN CSG Whitelist. The MME 208 then performs ongoing regular procedures, e.g., the serving MME 208 accepts the Tracking Area Update (TAU) if that was the procedure that was in progress. While the above exemplary embodiments take care of inclusions of VPLMN CSG IDs in the VPLMN CSG Whitelist, other exemplary mechanisms are described below for exclusions to the VPLMN CSG Whitelist.

According to exemplary embodiments, when a foreign subscriber is removed from a VPLMN CSG, the MMEs in the MME pool to which the CSG belongs to will be informed of the update from the home OMA&P system 204. An MME 208 may store this removal/exclusion information at least until the concerned foreign subscriber's UE 414 registers in the MME 208. When the UE 414 registers in the MME 208, the MME 208 will search its database of stored CSG data to determine whether the MME 208 needs to send an update to the UE 414. If stored CSG data indicates that the UE 414 has been removed from a VPLMN CSG, the MME 208 may update the VPLMN CSG Whitelist stored in the UE 414 by sending to the UE 414 an indication of the removal and the CSG ID of the concerned VPLMN CSG so that the UE 414 can update its VPLMN CSG Whitelist.

According to an alternative exemplary embodiment, another way to handle removals is that the VPLMN CSG ID is not removed from the VPLMN CSG Whitelist until the UE 414 attempts to access the concerned HeNB 304 and is rejected. This can trigger the UE 414 to remove the CSG ID from the VPLMN CSG Whitelist. In some cases the UE 414 may be connected to another MME pool in the VPLMN or not at all attached to the VPLMN when it is added as an allowed subscriber to a CSG in the VPLMN. When this is the case, the UE's CSG Whitelist for this VPLMN would not be updated instantly as there are no mechanisms for the VPLMN to update the UE's CSG Whitelist while the UE 414 is connected to another PLMN. This is, however, not seen as a problem as it is assumed that the macro network covering the HeNB 304 serving the relevant CSG cell is also served by the same MME pool. Therefore, according to exemplary embodiments, once the UE 414 gets connected to the macro network, the selected MME 208 can update the UE's CSG Whitelist. This also means that if the UE 414 would be connected to a totally different MME Pool in the VPLMN, then the UE's CSG Whitelist would be first updated when it moves in the macro network to the same MME pool as where the relevant HeNB 304 is connected to. This exemplary embodiment works when it is not necessary to update the UE's CSG Whitelist until the UE 414 is in a location where it is likely that it may be able to connect to the HeNB 304.

According to another exemplary embodiment, it is also possible that the HeNB 304 is located in a place without macro network coverage. If the UE 414 is, in this case, also located in the same place then the method to trigger the updating of the UE's CSG Whitelist is manual access attempt as also described in other exemplary embodiments herein. A foreign subscriber's membership in a VPLMN CSG may be associated with a lifetime. If so, the lifetime information is transferred in the CSG data from the home OMA&P system 204 to the MMEs and from the serving MME 208 to the UE 414 when the serving MME 208 indicates the VPLMN CSG Whitelist update to the UE 414. When this lifetime expires, the UE 414 should remove the concerned CSG ID from the VPLMN CSG Whitelist. The lifetime expiration would also be noted by the MMEs and when the UE 414 attempts an access the MME would reject the access attempt. If the UE 414 registers in another MME in the visited PLMN, this may trigger the new MME to start the above described procedure, which may result in a new, possibly redundant update of the UE VPLMN CSG Whitelist.

According to another exemplary embodiment, the serving MME 208 retrieves CSG Data from the home OMA&P System 204 when needed. In this exemplary embodiment, CSG data is not pushed to the MMEs from the home OMA&P system 204 in response to modification to CSG data stored in the home OMA&P system 204, instead MMEs are configured to fetch CSG data from the home OMA&P system 204 when a foreign UE 414 registers with the MME 208. In this manner, not all MMEs are provided with CSG data, only the serving MME 208 with which the UE 414 registers. After retrieving the CSG data from the home OMA&P system 204 the serving MME 208 would update the VPLMN CSG Whitelist in the UE 414 via, for example, NAS signaling.

According to other exemplary embodiments, the UE 414 may already be attached to an MME 208 in the VPLMN. In this exemplary embodiment, the CSG data that the MME 208 retrieves from the home OMA&P system 204 is different from the data pushed from the home OMA&P system 204 described above. Instead of being data associated with a certain CSG subscriber in the MME pool, the retrieved data consists of the CSG IDs of all the CSGs in the PLMN, i.e., the VPLMN from the UE's 414 point of view, in which the foreign subscriber is included. To support such requests from MMEs, the home OMA&P system 204 can, conceptually (although the actual implementation may vary), maintain a database of CSG data for foreign subscribers, keyed by the MSISDN (or possibly IMSI) of the foreign subscribers. That is, when the MME 208 requests data, it includes the foreign subscriber's MSISDN (or possibly IMSI) of the foreign subscriber and the home OMA&P system 204 retrieves from the database and returns to the MME 208 the CSG IDs of all the CSGs in the PLMN in which the foreign subscriber is a member.

In this exemplary embodiment, the MME 208 transfers the complete set of CSG IDs received from the home OMA&P system 204, e.g., the CSG IDs of all the CSGs in the VPLMN in which the foreign subscriber is a member, to the UE 414. Since the UE 414 in this way receives the complete list of CSG IDs of allowed CSGs in the VPLMN whenever the UE 414 registers in the VPLMN, it need not maintain this data when it leaves the VPLMN. Hence, the VPLMN CSG Whitelist may be a temporary list, which pertains to a single VPLMN and includes only CSG IDs of CSGs in this particular VPLMN which is deleted when the visiting UE 414 leaves the concerned VPLMN.

According to alternative embodiments, an alternative trigger of the MME's CSG data retrieval from the home OMA&P system 204 can occur from a UE 414 when the UE 414 makes a manual access at a CSG, e.g., the UE 414 overrides the contents of its VPLMN CSG Whitelist in order to force an access attempt in a CSG cell whose broadcast CSG ID is not included in the VPLMN CSG Whitelist. This access in the MME 208 can trigger the above described behavior, i.e., cause the serving MME 208 to fetch data from the home OMA&P system 204, update the UE VPLMN CSG Whitelist, etc. Since an MME pool normally would cover a large area, the user may stay registered in the same MME 208 for most of the stay in the VPLMN. If the UE 414 for some reason is allocated a new MME in the visited PLMN, the data stored in the previous MME 208, for example, the information about the allowed CSG cells, is deleted as well as other data stored for the visiting UE 414. When the UE 414 registers in a new MME in the VPLMN this would also trigger the new MME 208 to start the above described exemplary process, which would result in a new, possibly redundant update of the UE VPLMN CSG Whitelist. This update should not be any problem, since the UE 414 can choose to replace the list or just take care of the differences between the stored list and the received list. Additionally, in order to capture changes of the relevant CSG data done in the home OMA&P system 204, the MME 208 where the visiting UE 414 is registered could periodically, or as triggered by UE 414 events such as a TAU request, fetch CSG data from the home OMA&P system 204.

According to exemplary embodiments, removals can be captured whenever the MME 208 retrieves CSG data from the home OMA&P system 204 and the MME 208 conveys the retrieved list/data to the foreign UE 414. A CSG ID which has been removed from this data, because the foreign subscriber has been excluded from the CSG associated with the removed CSG ID, would then be removed from the VPLMN CSG Whitelist in the UE 414, since the UE 414 either replaces the old list or modifies the old list in order to make it equal to the received list.

Figure 10:
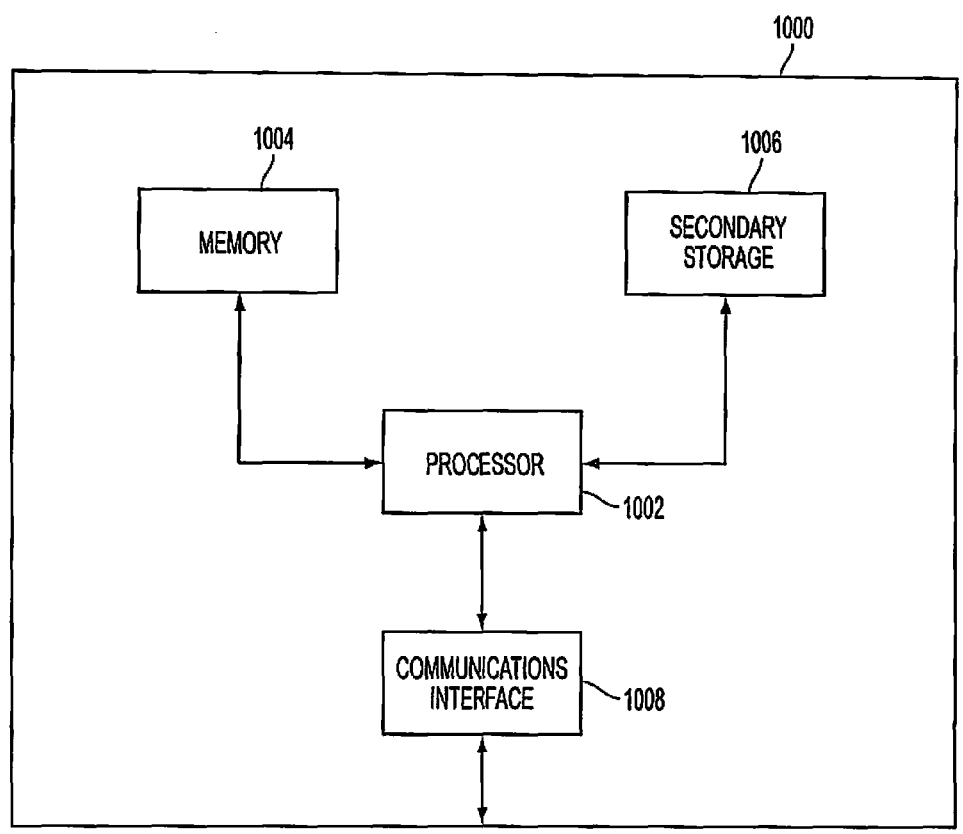
FIG. 10 depicts a communications node according to exemplary embodiments.

The exemplary embodiments described above provide methods and systems for core network node selection. As shown in FIG. 10, communications node 1000 (which can generically represent, e.g., an HeNB 304, a UE 414, a node in an OMA&P system and/an MME 208) can contain a processor 1002 (or multiple processor cores), memory 1004, one or more secondary storage devices 1006 and one or more communications interfaces 1008. As described above, for example, when representing an MME 208, the communications interfaces 1008 can include both an OMA&P-MME interface and an interface between the MME of one PLMN and the HSS of another PLMN. The processor 1002 in conjunction with information, e.g., instructions and CSG Whitelist information, stored in memory 1004 can perform the tasks described in the exemplary embodiments above for the various communication nodes used herein.

Figure 11:
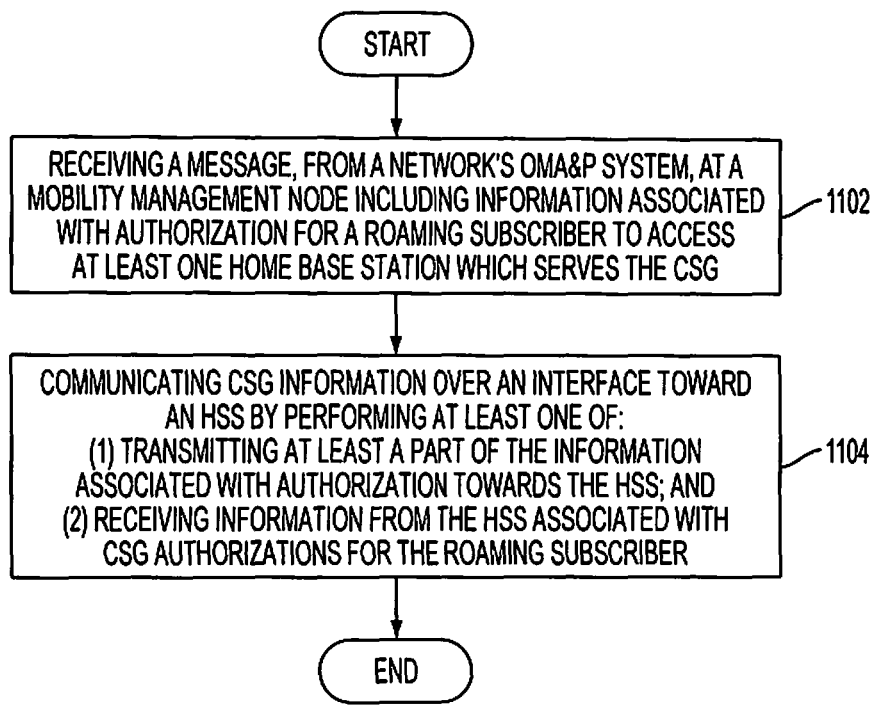
FIGS. 11-13 show method flowcharts according to exemplary embodiments.

Utilizing the above-described exemplary systems according to exemplary embodiments, a method for mobility management is shown in the flowchart of FIG. 11. Therein, at step 1102, a message is received, from a network's Operation Maintenance Administration and Provisioning, OMA&P, system, at a mobility management node, wherein the message includes information associated with authorization for a roaming subscriber to access the at least one home base station which serves the CSG. At step 1104, CSG information is communicated over an interface toward a home subscriber server (HSS) wherein the step of communicating comprises at least one of: (1) transmitting at least a part of the information associated with authorization for a roaming subscriber to access the at least one home base station which serves the CSG towards the HSS of the roaming subscriber and (2)

receiving information from the HSS associated with CSG authorizations for the roaming subscriber.

Figure 12:
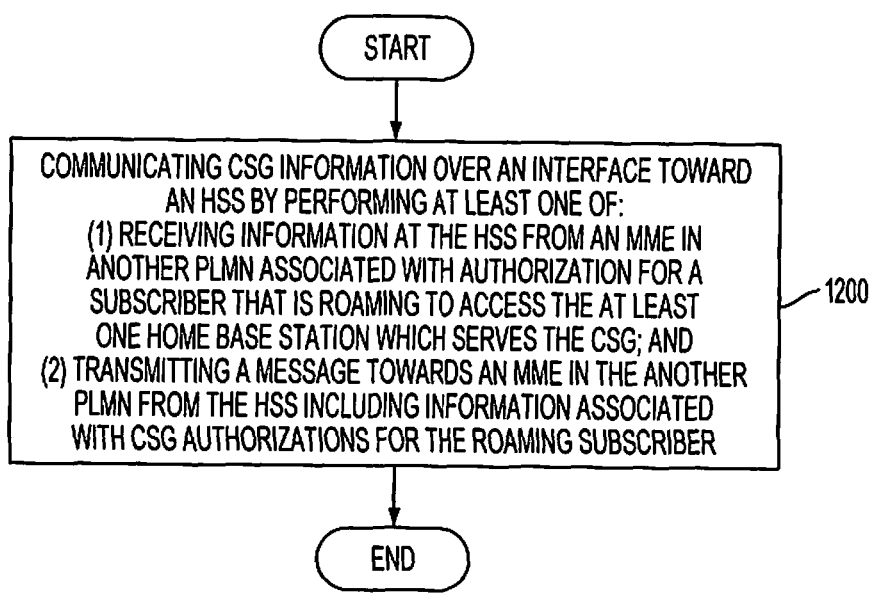

According to another exemplary embodiment, a method for mobility management in a communication system having a closed subscriber group, CSG, associated with at least one home base station is illustrated in the flowchart of FIG. 12. Therein, at step 1200, CSG information is communicated over an interface toward a home subscriber server (HSS) wherein said step of communicating comprises at least one of (1) receiving information at the HSS from a mobility management node in another public land mobile network (PLMN), wherein the information is associated with authorization for a subscriber that is roaming to access the at least one home base station which serves the CSG and (2) transmitting a message towards a mobility management node in the another PLMN from the HSS, wherein the message includes information associated with CSG authorizations for the subscriber that is roaming.

Figure 13:
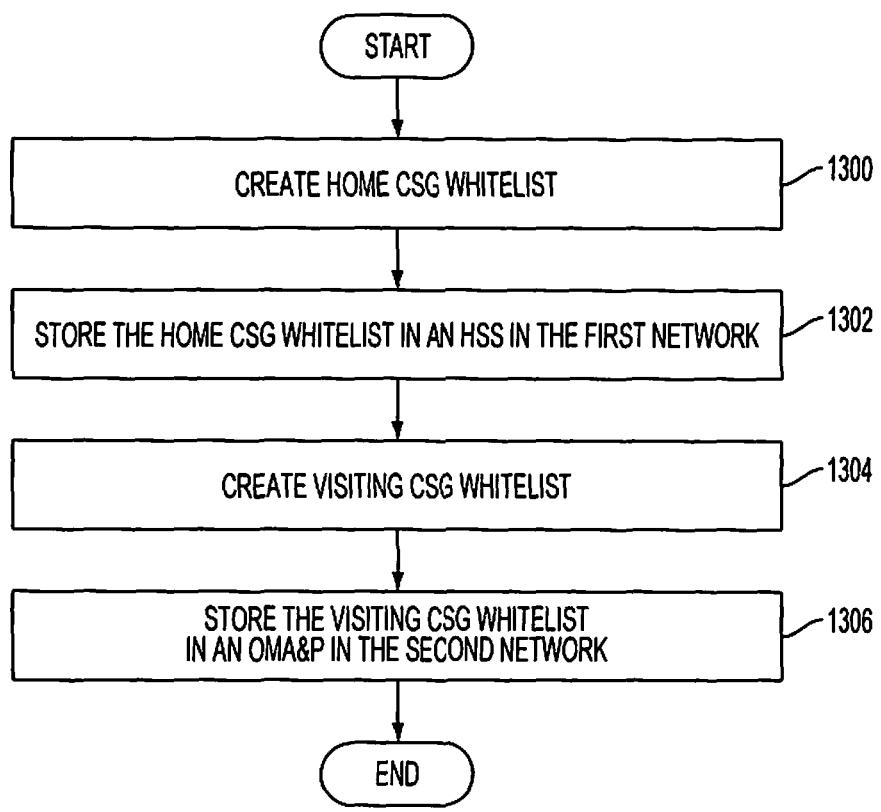

According to another exemplary embodiment, a method for mobility management in a communication system having two separate networks includes the steps shown in the flowchart of FIG. 13. Therein, at step 1300, a home closed subscriber group (CSG) Whitelist associated with a subscriber in a first network is created. This home CSG Whitelist is then stored, at step 1302, in the HSS of the first network. A visiting CSG Whitelist associated with the subscriber is created in a second network at step 1304. The visiting CSG Whitelist is then stored in an OMA&P system in the second network at step 1306.

The foregoing exemplary embodiments propose, among other things, to use existing interfaces for new purposes to facilitate roaming in systems employing CSGs. For completeness, some of the current uses of those interfaces will also be described, which uses can be performed in addition to those described above according to exemplary embodiments. Specifically, the OMA&P-MME interface is currently, for example, used for operation and maintenance tasks, including:

- the (O&M part of the) OMA&P system configures parameters in the MME;
- the (O&M part of the) OMA&P system retrieves data from readable parameters (such as counters) in the MME in order to monitor the performance of the MME; and
- the MME sends alarms to the (O&M part of the) OMA&P system (e.g. when a fault occur or a threshold for a critical parameter is exceeded);

Likewise, the interface between the MME of one PLMN and the HSS of another PLMN is currently used for:

- the MME to register a user location, i.e. the MME informs the HSS that the MME is now serving a user belonging to the HSS;
- the HSS to assist the MME in the authentication of the user, by providing the MME with authentication credentials;
- the HSS to provide the MME with subscriber data of a user that the MME has registered as being served by the MME, wherein the subscriber data includes information associated with the subscription, such as any particular restrictions or priviliges in the service to be given to the user, possibly information about which PDN GW to use, etc;
- the HSS also informs the MME when a user, which was previously registered as being served by the MME has been registered by another MME as being served by that other MME (i.e. the user has moved to a new location served by another MME (pool)).

While various embodiments of the present invention have been described above, it should be understood that they have been presented by way of example only, and not limitation. For example, while the above aspects and embodiments have been described in terms of EPS, they are equally applicable in 3G, replacing the EPS nodes with corresponding 3G nodes in the descriptions, e.g., replacing the MME with a SGSN (or possibly MSC/VLR or MSC server/VLR) and the HeNB with an HNB. Moreover, although the foregoing exemplary embodiments focus on re-use of, e.g., the S6a interface, other interfaces could also be re-used to exchange CSG roaming information, e.g., the Gr-interface and the D-interface. Thus, the breadth and scope of the present invention should not be limited by any of the above described exemplary embodiments. Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

What is claimed is:

1. A method for mobility management in a mobile network having a closed subscriber group, CSG, associated with at least one home base station, the method comprising:
   receiving, by a mobility management node, a message from an Operation Maintenance Administration and Provisioning, OMA&P, system, said message including first information associated with an authorization for a roaming subscriber from another mobile network than the mobility management node to access said at least one home base station which serves said CSG; and
   communicating, by said mobility management node, CSG information over an interface toward a home subscriber server, HSS, of the roaming subscriber, wherein said step of communicating comprises at least one of:
   (1) transmitting at least a part of said first information associated with the authorization for said roaming subscriber to access said at least one home base station which serves said CSG, towards said HSS, and
   (2) receiving second information from said HSS associated with CSG authorizations for said roaming subscriber,
   wherein said step of receiving said second information from said HSS associated with CSG authorizations for said roaming subscriber further comprises comparing, by said mobility management node, said message with said second information, and if a difference is found during said step of comparing, transmitting third information to update a CSG Whitelist of said roaming subscriber,
   said mobility management node maintains a list of foreign roaming subscribers whose CSG Whitelists need to be updated, and
   said list includes a unique identifier for each foreign roaming subscriber, an identification for each CSG to be updated and a type of change.

2. The method of claim 1, wherein said third information to update said CSG Whitelist of said roaming subscriber is transmitted to said HSS.

3. The method of claim 2, wherein an Open Mobile Alliance, OMA, Device Management, DM, protocol is used to transmit said third information from said HSS to a user equipment, UE, associated with said roaming subscriber via an Operation Maintenance Administration and Provisioning, OMA&P, system.

4. The method of claim 1, wherein said third information is transmitted to a UE associated with said roaming subscriber.

5. The method of claim 1, wherein said third information is a change in CSG information for said roaming subscriber.

6. The method of claim 1, wherein said third information is an updated CSG status for said roaming subscriber.

7. The method of claim 1, wherein said third information includes at least one of granting authorization to a CSG or removing authorization to a CSG.

8. The method of claim 1, wherein said list includes a lifetime associated with each inclusion type of change associated with a CSG change, wherein when said lifetime expires, said CSG change is removed from said list.

9. The method of claim 1, further comprising:
receiving a registration message, from a roaming user equipment, UE, at said mobility management node, said registration message including fourth information associated with said roaming subscriber which requests access to the mobile network in which said at least one home base station is associated.

10. The method of claim 1, wherein said interface toward said HSS is one of an S6a interface, a GR-interface and a D-interface.

11. The method of claim 1, wherein said mobility management node is one of an MME, an SGSN, an MSC/VLR and an MSC Server/VLR.

12. A method for mobility management in a communication system having two separate networks comprising:
creating a home closed subscriber group, CSG, Whitelist associated with a subscriber in a first network;
storing said home CSG Whitelist associated with said subscriber in a home subscriber server, HSS, in said first network;
creating a visiting CSG Whitelist associated with said subscriber in a second network;
storing said visiting CSG Whitelist associated with said subscriber in an Operations Maintenance Administrative and Provisioning, OMA&P, system in said second network
fetching, by a mobility management node, CSG information from said OMA&P system when a visiting subscriber registers in a network.

13. The method of claim 12, further comprising:
determining access to a CSG associated with at least one home base station based on information stored in said home CSG Whitelist or said visiting CSG Whitelist.

14. The method of claim 12, further comprising:
transferring, by said OMA&P system, information about one or more visiting subscribers to a mobility management node when said one or more visiting subscribers are authorized to access said CSG in order to update said visiting CSG Whitelist.

15. A method for mobility management in a communication system having two separate networks, comprising:
creating a home closed subscriber group, CSG, Whitelist associated with a subscriber in a first network;
storing said home CSG Whitelist associated with said subscriber in a home subscriber server, HSS, in said first network;
creating a visiting CSG Whitelist associated with said subscriber in a second network;
storing said visiting CSG Whitelist associated with said subscriber in an Operations Maintenance Administrative and Provisioning, OMA&P, system in said second network; and
fetching, by a mobility management node, CSG information from said OMA&P system when a visiting subscriber attempts to access said CSG.

16. The method of claim 15, further comprising:
determining access to a CSG associated with at least one home base station based on information stored in said home CSG Whitelist or said visiting CSG Whitelist.

17. The method of claim 15, further comprising:
transferring, by said OMA&P system, information about one or more visiting subscribers to a mobility management node when said one or more visiting subscribers are authorized to access said CSG in order to update said visiting CSG Whitelist.

18. A mobility management node comprising:
an interface configured to receive a message, from a network's Operation Maintenance Administration and Provisioning, OMA&P, system, wherein said message includes first information associated with authorization for a roaming subscriber to access at least one home base station which serves a closed subscriber group, CSG, and
a processor configured to communicate CSG information over another interface toward a home subscriber server, HSS, of said roaming subscriber by performing at least one of:
(1) transmitting at least a part of said first information towards said HSS of said roaming subscriber, and
(2) receiving second information from said HSS associated with CSG authorizations for said roaming subscriber, wherein,
when said processor receives said information from said HSS, said processor is further configured to compare said message with said second information and, if a difference is found, to transmit third information to update a CSG Whitelist of said roaming subscriber,
said mobility management node maintains a list of foreign roaming subscribers whose CSG Whitelists need to be updated, and
said list includes a unique identifier for each foreign roaming subscriber, an identification for each CSG to be updated and a type of change.

19. The mobility management node of claim 18, wherein said third information is transmitted to said HSS which is in a home mobile network of said roaming subscriber.

20. The mobility management node of claim 19, wherein an Open Mobile Alliance, OMA, Device Management, DM, protocol is used to transmit said third information from said HSS to a user equipment, UE, associated with said roaming subscriber via an Operation Maintenance Administration and Provisioning, OMA&P, system.

21. The mobility management node of claim 18, wherein said third information is transmitted to a UE associated with said roaming subscriber.

22. The mobility management node of claim 18, wherein said third information is a change in CSG information for said roaming subscriber.

23. The mobility management node of claim 18, wherein said third information is an updated CSG status for said roaming subscriber.

24. The mobility management node of claim 18, wherein said third information includes at least one of granting authorization to a CSG or removing authorization to a CSG.

25. The mobility management node of claim 18, wherein said list includes a lifetime associated with each inclusion type of change associated with a CSG change, wherein when said lifetime expires, said CSG change is removed from said list.

26. The mobility management node of claim 18, wherein said interface is further configured to receive a registration message, from a roaming user equipment, UE, at said mobility management node, said registration message including fourth information associated with said roaming subscriber which requests access to a network in which said at least one home base station is associated.

27. The mobility management node of claim 18, wherein said interface toward said HSS is one of an S6a interface, a Gr-interface, and a D-interface.

28. The mobility management node of claim 18, wherein said mobility management node is one of an MME, an SGSN, an MSC/VLR, and an MSC Server/VLR.

* * * * *

UNITED STATES PATENT AND TRADEMARK OFFICE
CERTIFICATE OF CORRECTION

PATENT NO. : 8,626,155 B2  Page 1 of 1
APPLICATION NO. : 13/130204
DATED : January 7, 2014
INVENTOR(S) : Rune et al.

It is certified that error appears in the above-identified patent and that said Letters Patent is hereby corrected as shown below:

On the Title Page, Item (57), under "ABSTRACT", in Column 2, Line 5, delete "White lists" and insert -- Whitelists --, therefor.

In the Specification

In Column 12, Line 45, delete "PLMN 404" and insert -- PLMN 408 --, therefor.

In Column 12, Line 49, delete "PLMN 402" and insert -- PLMN 202 --, therefor.

In Column 12, Line 51, delete "PLMN 402" and insert -- PLMN 408 --, therefor.

In Column 12, Line 52, delete "PLMN 402" and insert -- PLMN 202 --, therefor.

In Column 14, Line 36, delete "PLMN 402," and insert -- PLMN 408, --, therefor.

In Column 14, Line 60, delete "HeNB 204" and insert -- HeNB 304 --, therefor.

In Column 24, Line 26, delete "MME 204" and insert -- MME 208 --, therefor.

In Column 29, Line 9, delete "of" and insert -- of: --, therefor.

In Column 29, Line 58, delete "priviliges" and insert -- privileges --, therefor.

In the Claims

In Column 31, Line 45, in Claim 12, delete "network" and insert -- network; and --, therefor.

In Column 31, Line 67, in Claim 15, delete "network:" and insert -- network; --, therefor.

Signed and Sealed this
Fifteenth Day of July, 2014

Michelle K. Lee
*Deputy Director of the United States Patent and Trademark Office*